US012602497B2

(12) United States Patent
Venkatesan et al.

(10) Patent No.: US 12,602,497 B2
(45) Date of Patent: Apr. 14, 2026

(54) VERIFIABLE ATTRIBUTE MAPS

(71) Applicant: Microsoft Technology Licensing, LLC, Redmond, WA (US)

(72) Inventors: Ramarathnam Venkatesan, Redmond, WA (US); Srinath T. V. Setty, Redmond, WA (US); Nishanth Chandran, Bangalore (IN); Panagiotis Antonopoulos, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 17/934,730

(22) Filed: Sep. 23, 2022

(65) Prior Publication Data

US 2024/0104229 A1      Mar. 28, 2024

(51) Int. Cl.
*G06F 21/62* (2013.01)
*H04L 9/00* (2022.01)
(52) U.S. Cl.
CPC ............... *G06F 21/62* (2013.01); *H04L 9/50* (2022.05)
(58) Field of Classification Search
CPC .................................. G06F 21/62; H04L 9/50
See application file for complete search history.

(56) References Cited

U.S. PATENT DOCUMENTS 8,601,549 B2 * 12/2013 Dickerson ........... G06F 21/6218
726/28
9,547,771 B2    1/2017 Roth
10,211,977 B1    2/2019 Roth
10,637,855 B2    4/2020 Mikulski
10,990,689 B1 *  4/2021 Reiner ................. G06F 21/604
11,036,869 B2    6/2021 Roth
(Continued)

FOREIGN PATENT DOCUMENTS

CN        110363528 A      10/2019
CN        114221764 A       3/2022
JP       2022020557 A       2/2022

OTHER PUBLICATIONS

International Search Report and Written Opinion received for PCT Application No. PCT/US2023/031452, Dec. 4, 2023, 11 pages.
(Continued)

*Primary Examiner* — Jason Chiang

(57) ABSTRACT

Verifiable attribute maps that maintain references to identities and attribute information associated with the identities are disclosed. A verifiable attribute map is maintained by a ledger database that provides tamper-resistant/evident capabilities for tables (comprising the map) thereof. For instance, when a materialized view of the database is generated, the database provides a digest representative of a state thereof to computing devices that access the map for the attribute information. When the database receives a request from a device to access the map, the digest is received along therewith. The database is validated based on the digest to determine whether the database has been tampered with since the provision of the digest. Responsive to a successful validation, the database provides access in accordance with the request. When attribute information in the map is updated, the database subsequently generates a new digest, which is provided to the computing device.

20 Claims, 13 Drawing Sheets

(56) References Cited

U.S. PATENT DOCUMENTS

| | | | |
|---|---|---|---|
| 11,139,954 B2 | 10/2021 | Mercuri | |
| 11,424,920 B2 | 8/2022 | Bursell et al. | |
| 11,544,409 B2 * | 1/2023 | Brannon | G06F 21/6245 |
| 11,593,316 B2 * | 2/2023 | Haldar | G06F 11/1448 |
| 11,695,555 B2 | 7/2023 | Roth | |
| 11,799,630 B2 * | 10/2023 | Zhang | G06F 21/64 |
| 11,886,574 B2 | 1/2024 | Bursell et al. | |
| 12,058,265 B2 | 8/2024 | Khoury | |
| 12,107,900 B2 * | 10/2024 | Gargaro | H04L 63/101 |
| 2002/0023213 A1 * | 2/2002 | Walker | H04L 51/222 |
| | | | 713/168 |
| 2002/0138738 A1 * | 9/2002 | Sames | H04L 63/14 |
| | | | 713/185 |
| 2007/0055867 A1 | 3/2007 | Kanungo et al. | |
| 2012/0060207 A1 * | 3/2012 | Mardikar | H04L 63/20 |
| | | | 726/4 |
| 2013/0145151 A1 | 6/2013 | Brown | |
| 2015/0089575 A1 * | 3/2015 | Vepa | H04L 63/20 |
| | | | 726/1 |
| 2015/0288669 A1 * | 10/2015 | Litoiu | G06F 16/9535 |
| | | | 726/4 |
| 2015/0381575 A1 | 12/2015 | Bhargav-spantzel et al. | |
| 2017/0041148 A1 * | 2/2017 | Pearce | H04L 63/126 |
| 2017/0111175 A1 | 4/2017 | Oberhauser et al. | |
| 2019/0020485 A1 | 1/2019 | Uhr | |
| 2019/0163912 A1 * | 5/2019 | Kumar | H04L 9/3263 |
| 2019/0258811 A1 * | 8/2019 | Ferraiolo | G06F 21/6218 |
| 2019/0370358 A1 * | 12/2019 | Nation | G06F 16/1805 |
| 2019/0394175 A1 * | 12/2019 | Zhang | H04L 63/0435 |
| 2020/0014537 A1 | 1/2020 | Ortiz | |
| 2020/0082401 A1 | 3/2020 | Arora | |
| 2020/0322342 A1 * | 10/2020 | Gokhale | H04L 63/108 |
| 2020/0374105 A1 | 11/2020 | Padmanabhan | |
| 2020/0396222 A1 * | 12/2020 | Gargaro | H04L 63/20 |
| 2020/0404023 A1 | 12/2020 | Zhu | |
| 2021/0089676 A1 | 3/2021 | Ford | |
| 2021/0092607 A1 * | 3/2021 | Klinkner | H04L 9/14 |
| 2021/0218742 A1 * | 7/2021 | Cook | G06F 21/31 |
| 2021/0232707 A1 * | 7/2021 | Wilson | H04L 9/3247 |
| 2021/0233673 A1 * | 7/2021 | Zhang | H04L 63/20 |
| 2021/0273931 A1 | 9/2021 | Murdoch et al. | |
| 2021/0279355 A1 | 9/2021 | Otte | |
| 2021/0303714 A1 * | 9/2021 | Yaghoobi | G06N 3/08 |
| 2021/0367778 A1 | 11/2021 | Hamel | |
| 2021/0377037 A1 | 12/2021 | Antonopoulos et al. | |
| 2022/0020003 A1 * | 1/2022 | Sarkar | G06Q 20/38215 |
| 2022/0021711 A1 * | 1/2022 | Marsh | H04L 9/3247 |
| 2022/0138181 A1 * | 5/2022 | Irazabal | G06F 16/2379 |
| | | | 707/703 |
| 2022/0188810 A1 * | 6/2022 | Doney | G06Q 20/401 |
| 2022/0269927 A1 * | 8/2022 | Rice | G06F 16/283 |
| 2022/0271936 A1 * | 8/2022 | Doney | H04L 9/3247 |
| 2022/0292211 A1 * | 9/2022 | Reineke | G06F 21/6218 |
| 2022/0400020 A1 * | 12/2022 | Davies | H04L 9/50 |
| 2022/0417254 A1 | 12/2022 | Michaelis | |
| 2023/0015569 A1 * | 1/2023 | Davies | G06Q 20/3827 |
| 2023/0035317 A1 * | 2/2023 | Jufer | G06F 21/6209 |
| 2023/0336547 A1 * | 10/2023 | Damour | H04L 63/0876 |
| 2023/0379699 A1 * | 11/2023 | Oerton | H04W 12/37 |
| 2023/0388348 A1 * | 11/2023 | Authement | H04L 63/20 |
| 2024/0056424 A1 * | 2/2024 | Venkatesan | H04L 9/3239 |
| 2024/0089098 A1 | 3/2024 | Venkatesan | |
| 2024/0114012 A1 * | 4/2024 | Venkatesan | H04L 63/105 |
| 2024/0119168 A1 | 4/2024 | Venkatesan | |
| 2024/0121081 A1 | 4/2024 | Venkatesan | |

OTHER PUBLICATIONS

International Search Report and Written Opinion received for PCT Application No. PCT/US23/030988, mailed on Nov. 30, 2023, 13 pages.

Non-Final Office Action mailed on Jul. 2, 2024, in U.S. Appl. No. 17/819,030, 7 pages.

"Application as Filed in U.S. Appl. No. 17/819,030", filed Aug. 11, 2022, 57 Pages.

Non-Final Office Action mailed on Sep. 6, 2024, in U.S. Appl. No. 17/937,098, 18 pages.

Antonopoulos, et al., "SQL Ledger: Cryptographically Verifiable Data in Azure SQL Database", In Proceedings of the International Conference on Management of Data, Jun. 20, 2021, pp. 2437-2449.

"International Search Report and Written Opinion Issued in PCT Application No. PCT/US23/027303", Mailed Date: Oct. 13, 2023, 12 Pages.

Yue, et al., "GlassDB: An Efficient Verifiable Ledger Database System Through Transparency", In repository of arXiv:2207. 00944v2, Aug. 8, 2022, 14 Pages.

"International Search Report and Written Opinion Issued in PCT Application No. PCT/US23/030412", Mailed Date: Oct. 18, 2023, 12 Pages.

Singh, et al., "Security for Online Transaction Based on User Location", In Journal of International Journal for Innovative Research in Multidisciplinary Field, vol. 3, Issue 4, Apr. 1, 2017, pp. 60-64.

Alansari., "A Blockchain-Based Approach for Secure, Transparent and Accountable Personal Data Sharing", A thesis submitted in partial fulfillment for the degree of Doctor of Philosophy, Aug. 2, 2020, 213 pages.

International Search Report and Written Opinion received for PCT Application No. PCT/US2023/031022, mailed on Dec. 11, 2023, 16 pages.

Mounnan, et al., "Efficient Distributed Access Control Using Blockchain for Big Data in Clouds", International Conference on Wireless and Mobile Communications (ICWMC), Jun. 30, 2019, pp. 53-62.

Non-Final Office Action mailed on Oct. 9, 2024, in U.S. Appl. No. 17/931,733, 7 pages.

Non-Final Office Action mailed on Oct. 9, 2024, in U.S. Appl. No. 18/045,335, 13 pages.

Notice of Allowance mailed on Sep. 27, 2024, in U.S. Appl. No. 17/819,030, 5 pages.

Notice of Allowance mailed on Jan. 15, 2025, in U.S. Appl. No. 17/819,030, 5 pages.

Non-Final Office Action mailed on Nov. 4, 2024, in U.S. Appl. No. 17/938,711, 8 pages.

U.S. Appl. No. 17/937,098, filed Sep. 30, 2022.

U.S. Appl. No. 18/045,335, filed Oct. 10, 2022.

U.S. Appl. No. 17/931,733, filed Sep. 13, 2022.

U.S. Appl. No. 17/819,030, filed Aug. 11, 2022.

International Search Report and Written Opinion received for PCT Application No. PCT/US23/031471, Nov. 14, 2023, 18 pages.

Jaroucheh, et al., "Secretation: Toward a Decentralised Identity and Verifiable Credentials Based Scalable and Decentralised Secret Management Solution", IEEE International Conference on Blockchain and Cryptocurrency, 20201, 09 Pages.

Notice of Allowance mailed on Mar. 14, 2025, in U.S. Appl. No. 17/937,098, 12 pages.

U.S. Appl. No. 17/938,711, filed Oct. 7, 2022.

Notice of Allowance mailed on Feb. 26, 2025, in U.S. Appl. No. 17/931,733, 7 pages.

Notice of Allowance mailed on Mar. 5, 2025, in U.S. Appl. No. 17/938,711, 11 Pages.

International Preliminary Report on Patentability received for PCT Application No. PCT/US23/031471, mailed on Apr. 24, 2025, 14 pages.

International Preliminary Report on Patentability received for PCT Application No. PCT/US23/030988, Apr. 3, 2025, 08 pages.

Notice of Allowance mailed on May 19, 2025, in U.S. Appl. No. 17/937,098 12 pages.

Notice of Allowance mailed on May 20, 2025, in U.S. Appl. No. 17/938,711, 11 pages.

Notice of Allowance mailed on May 29, 2025, in U.S. Appl. No. 17/819,030, 06 pages.

International Preliminary Report on Patentability received for PCT Application No. PCT/US23/031022, mailed on Apr. 10, 2025, 09 pages.

Notice of Allowance mailed on Jun. 10, 2025, in U.S. Appl. No. 17/931,733, 05 pages.

(56)                    References Cited

OTHER PUBLICATIONS

Final Office Action mailed on Apr. 16, 2025, in U.S. Appl. No. 18/045,335 06 Pages.
International Preliminary Report on Patentability received for PCT Application No. PCT/US23/030412, Mar. 27, 2025, 08 Pages.
Notice of Allowance mailed on Nov. 24, 2025, in U.S. Appl. No. 18/045,335, 05 Pages.
Communication under Rule 71(3) received for European Patent Application No. 23773007.2, mailed on Dec. 10, 2025, 07 pages.

* cited by examiner

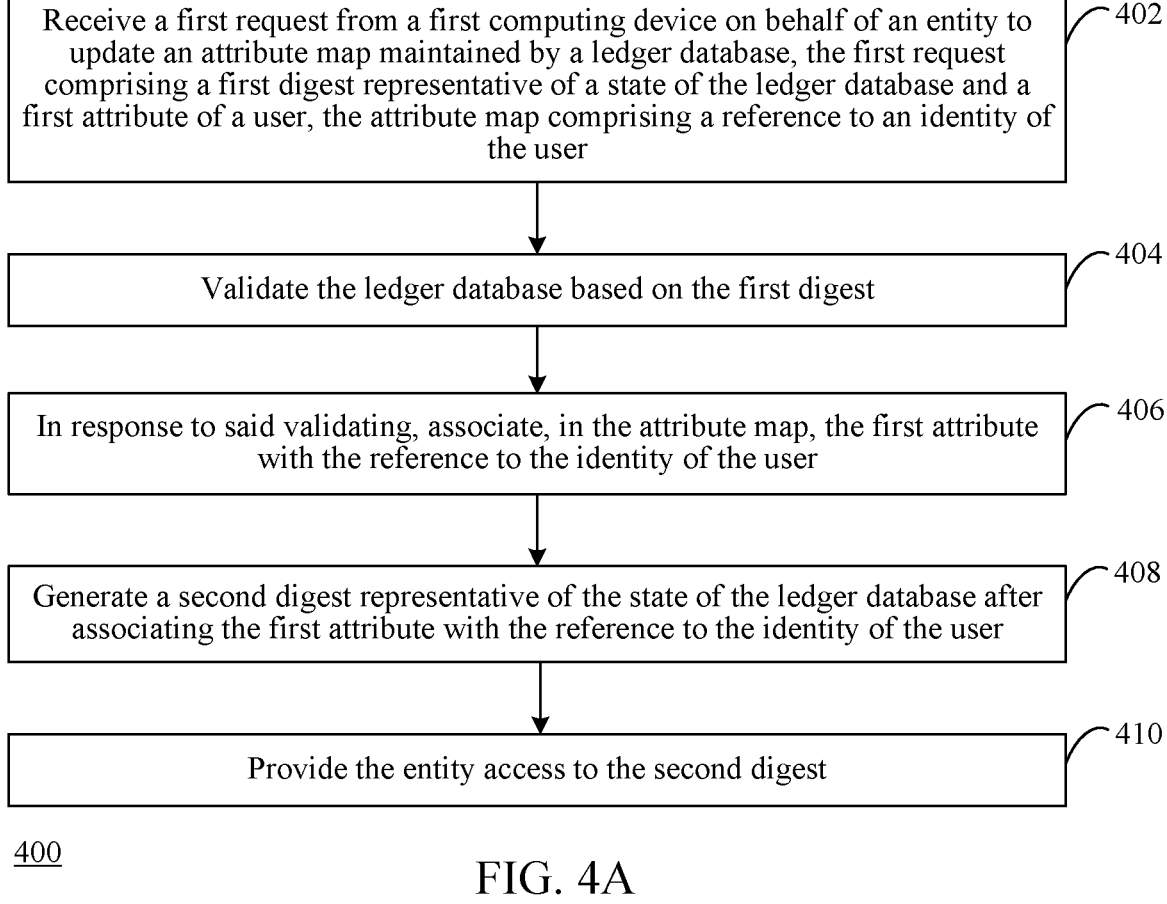

Receive a first request from a first computing device on behalf of an entity to update an attribute map maintained by a ledger database, the first request comprising a first digest representative of a state of the ledger database and a first attribute of a user, the attribute map comprising a reference to an identity of the user ⌐402

Validate the ledger database based on the first digest ⌐404

In response to said validating, associate, in the attribute map, the first attribute with the reference to the identity of the user ⌐406

Generate a second digest representative of the state of the ledger database after associating the first attribute with the reference to the identity of the user ⌐408

Provide the entity access to the second digest ⌐410

Associate a secret corresponding to the first attribute with the reference to the identity of the second user ⌐422

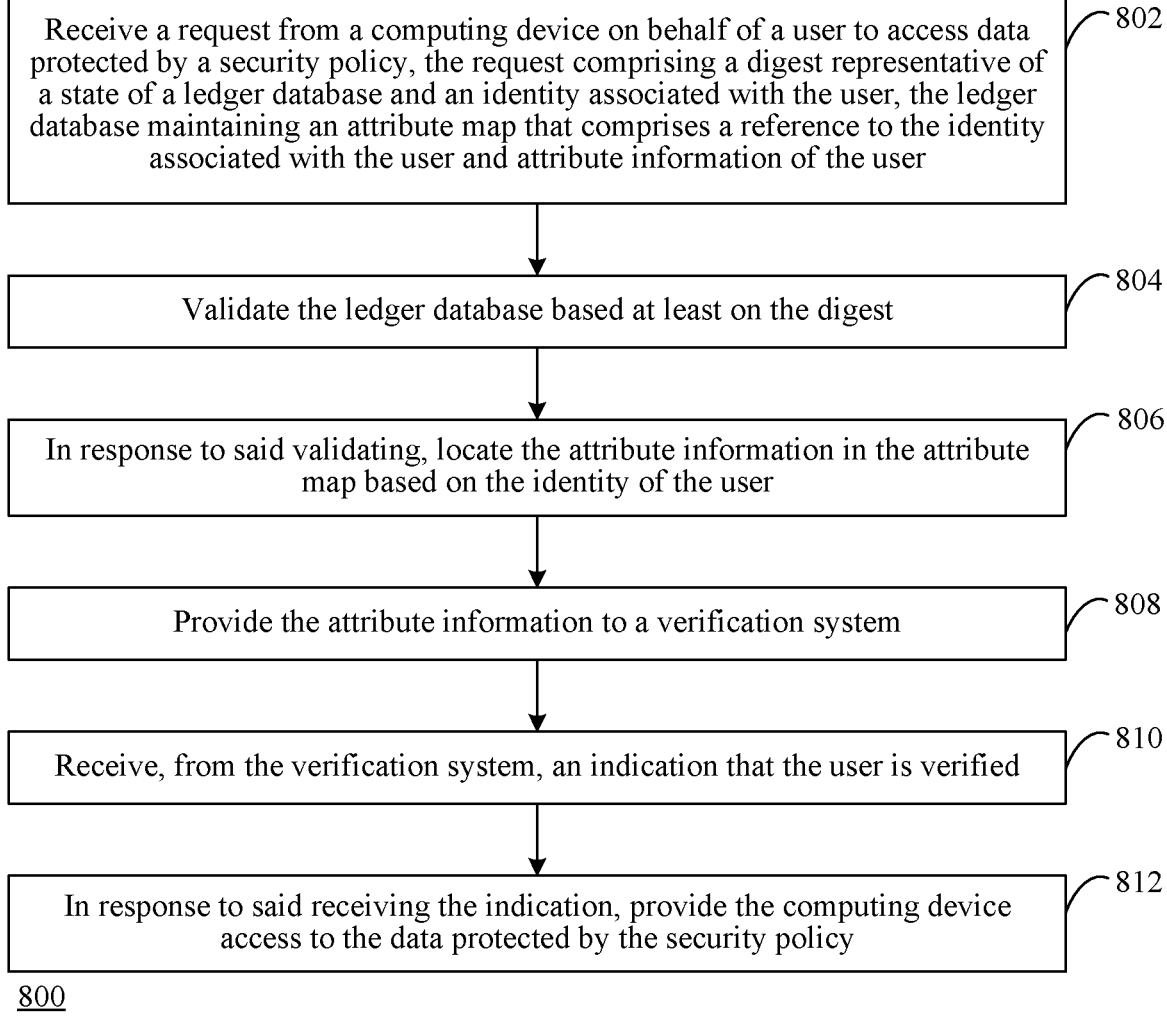

Receive a request from a computing device on behalf of a user to access data protected by a security policy, the request comprising a digest representative of a state of a ledger database and an identity associated with the user, the ledger database maintaining an attribute map that comprises a reference to the identity associated with the user and attribute information of the user ⌐802

Validate the ledger database based at least on the digest ⌐804

In response to said validating, locate the attribute information in the attribute map based on the identity of the user ⌐806

Provide the attribute information to a verification system ⌐808

Receive, from the verification system, an indication that the user is verified ⌐810

In response to said receiving the indication, provide the computing device access to the data protected by the security policy ⌐812

VERIFIABLE ATTRIBUTE MAPS

BACKGROUND

Systems used to access secured (e.g., encrypted) data may utilize different security policies to determine whether or not a user should be provided access to data protected by the security policy. If the user meets access criteria for the security policy, the system provides them with access to the data. If the user does not meet access criteria does not meet access criteria for the security policy, the user is not granted access to the data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and devices are described herein are directed to verifiable attribute maps that maintain references to identities and attribute information associated with the identities. Attribute information includes attributes and/or secrets associated with the attributes. The verifiable attribute map is maintained by a ledger database that provides tamper-resistant/evident capabilities for tables (comprising the attribute map) thereof, such that it can be cryptographically attested that the attribute map maintained by the ledger database has not been tampered with. When a materialized view of the ledger database is generated, the ledger database provides a digest representative of a state thereof to computing devices that access the attribute map, such as to update or lookup attribute information. The digest is received with a request received by the ledger database from a particular computing device to update or lookup attribute information in the attribute map. The ledger database determines a root hash value representative of the contents thereof and validates the root hash value against the digest to determine whether the ledger database has been tampered with since the provision of the digest. Responsive to a successful validation, the ledger database completes the update or lookup in accordance with the request. In the event that a reference to an identity and/or attribute information was updated, the ledger database subsequently generates a new digest and provides the computing device access to the new digest.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 4A shows a flowchart of a process for updating an attribute map in accordance with an example.

FIG. 4B shows a flowchart of a process for associating a secret with a reference to an identity in accordance with an embodiment.

FIG. 8 shows a flowchart of a process for retrieving information from an attribute map in accordance with an example embodiment.

Figure 1:
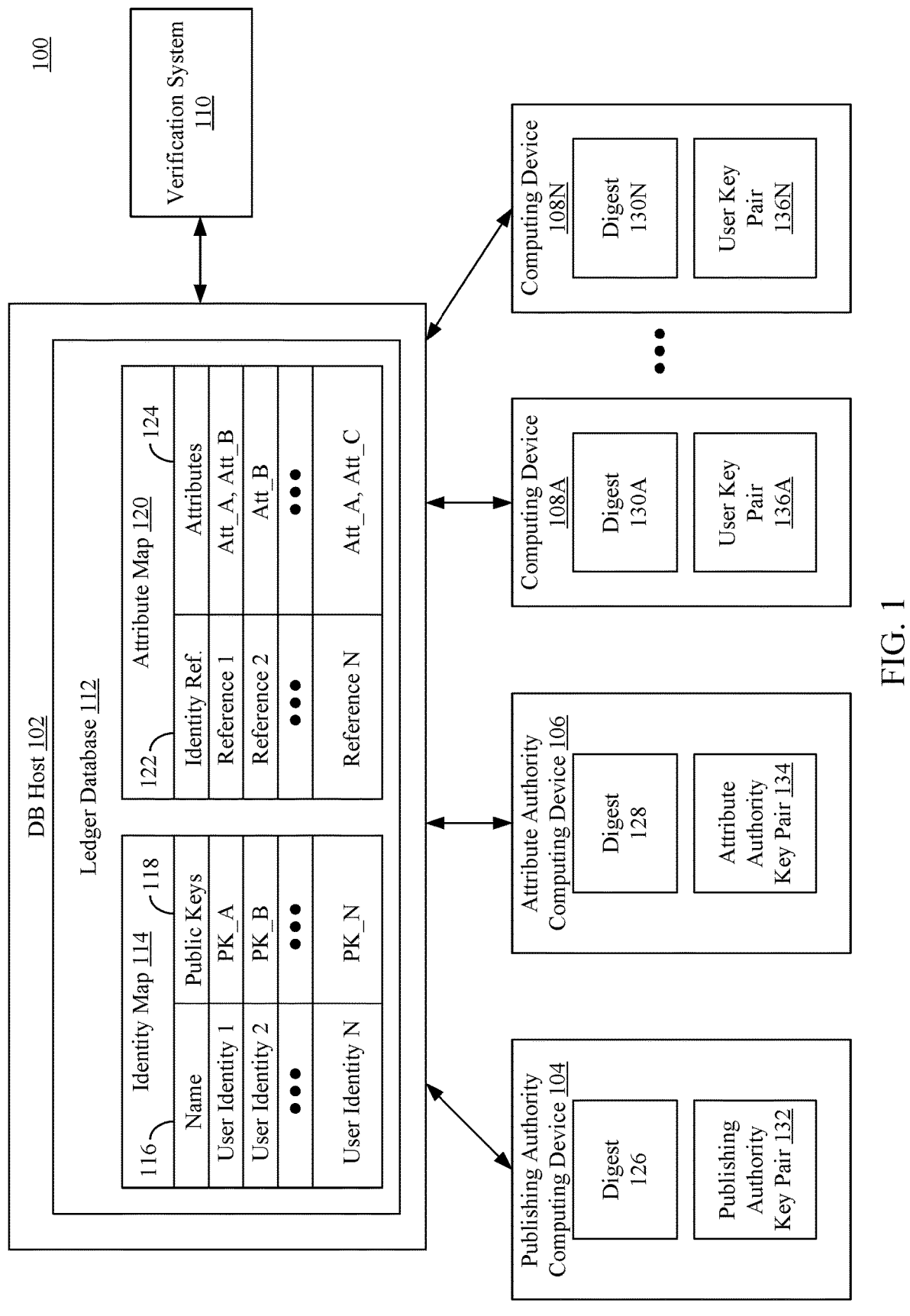
FIG. 1 shows a block diagram of an example system for providing a verifiable attribute map in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Example Embodiments

The following detailed description discloses numerous example embodiments. The scope of the present patent application is not limited to the disclosed embodiments, but also encompasses combinations of the disclosed embodiments, as well as modifications to the disclosed embodiments.

Systems used to access secured (e.g., encrypted) data may utilize different security policies to determine whether or not a user should be provided access to data protected by the security policy. If the user meets access criteria for the security policy, the system provides them with access to the data. If the user does not meet access criteria does not meet access criteria for the security policy, the user is not granted access to the data. For example, a system may utilize an attribute based access control (ABAC) policy to determine whether or not a user requesting access to data (or another resource) protected by the ABAC policy has the attributes that satisfy access criteria of the ABAC policy. One potential security vulnerability in using an ABAC policy arises when a trusted component that enforces the policy for accessing the protected data is compromised. Another potential security vulnerability in using an ABAC policy arises when a trusted component that maintains attribute information for users is compromised. In either case, if a malicious entity manages to infiltrate the trusted component, the malicious entity is free to move laterally and access or exfiltrate sensitive data.

Embodiments described herein are directed to a verifiable attribute map that maintains references to identities of users and attribute information associated with the references to the identities. Examples of references to identities include, but are not limited to, identities, copies of identities maintained external to the verifiable attribute map, and/or a link to an identity maintained external to the verifiable attribute map. Attribute information includes attributes associated with the references to identities and, optionally, secrets associated with the references to identities. Examples of attributes associated to a user include, but are not limited to, security clearance of a user (e.g., government security clearance), administrative status, job position, and/or any other characteristic that may be attributed to a user by an authority that maintains the verifiable attribute map. In accordance with an embodiment, a secret is a proof that a reference to an identity has one or more particular attributes. In accordance with a further embodiment, the secret is encrypted with a private signing key of a secret manager.

Verifiable attribute maps are maintained, generated, and/ or managed by, and/or on behalf of, one or more entities. Examples of entities include, but are not limited to, individual users, groups of users, and organizations. Examples of organizations include, but are not limited to, enterprises, non-profit companies, non-profit groups, governmental institutions, governmental bodies, and governmental agencies. As will be described further herein, entities are granted attribute permission and/or publishing permission with respect to an attribute map or attributes within an attribute map. Entities with attribute permissions are referred to herein as "attribute authorities." An attribute authority has authorization to add, modify, and/or remove attributes associated with references to identities in a verifiable attribute map. Entities with publishing permissions are referred to herein as "publishing authorities." A publishing authority has authorization to publish an attribute map on behalf of one or more attribute authorities to provide computing devices access to the attribute map. In accordance with an embodiment, a publishing authority also has attribute permissions. In accordance with an embodiment, an attribute authority also has publishing permissions.

The verifiable attribute map is maintained by a ledger database that provides tamper-resistant/evident capabilities for tables (comprising the attribute map) thereof, where one can cryptographically attest that the attribute map maintained by the ledger database has not been tampered with. For instance, when a materialized view of the ledger database is generated, the ledger database provides a digest representative of a state thereof to computing devices that access the attribute map, for example, to update or lookup attributes. When the ledger database receives a request from a particular computing device to update or lookup an attribute in the attribute map, the digest is received along therewith. The ledger database then determines a root hash value representative of the contents thereof and validates the root hash value against the digest to determine whether the ledger database has been tampered with since the provision of the digest. Responsive to a successful validation, the ledger database completes the update or lookup in accordance with the request. In the event that a reference to an identity and/or attribute information was updated, the ledger database subsequently generates a new digest and provides the computing device access to the new digest.

The techniques described herein advantageously provide improvements in other technologies, namely data encryption, security, and privacy. For example, access to personal and/or confidential information is prevented by associating attribute information with references to identities. By doing so, the techniques described herein prevent users without the appropriate attributes from accessing personal and/or confidential information protected by a security policy that utilizes attribute information. For instance, a security policy may require an identity to be associated with an attribute in order to access data protected by the security policy. A verification system verifies the identity is associated with the attribute (e.g., based on attribute information stored in an attribute map) in order to determine whether the identity should have access to the data protected by the security policy. By doing so, the techniques described herein also prevent access to network and computing entities (e.g., computing devices, virtual machines, etc.) accessible to users with a corresponding attribute. By mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

FIG. 1 shows a block diagram of an example system for providing a verifiable attribute map in accordance with an embodiment. As shown in FIG. 1, system 100 includes a database (DB) host 102, a publishing authority computing device 104, an attribute authority computing device 106, a plurality of computing devices 108A-108N and a verification system 110. Each of publishing authority computing device 104, attribute authority computing device 106, and computing devices 108A-108N is any type of processing device, including, but not limited to, a desktop computer, a server, a mobile or handheld device (e.g., a tablet, a personal data assistant (PDA), a smart phone, a laptop, etc.), an Internet-of-Things (IoT) device, or other suitable device mentioned elsewhere herein or otherwise known.

DB host 102 comprises one or more server computers or computing devices, which include one or more distributed or "cloud-based" servers, in embodiments. In embodiments, DB host 102 is associated with, or is a part of, a cloud-based service platform and in some embodiments, DB host 102 comprises an on-premises server(s) in addition to, or in lieu of, cloud-based servers. DB host 102 hosts and executes a DB server application, such as but not limited to, Amazon Aurora® of Amazon Web Services, Inc., Azure SQL Database™ of Microsoft Corporation, or other network-based database application. In embodiments, DB host 102, publishing authority computing device 104, attribute authority computing device 106, computing devices 108A-108N, and verification system 110 are communicatively coupled via one or more networks, comprising one or more of local area networks (LANs), wide area networks (WANs), enterprise networks, the Internet, etc., and includes one or more of wired and/or wireless portions. As shown in FIG. 1, publishing authority computing device 104 and attribute authority computing device 106 are separate computing devices; however, in an alternative embodiment, publishing authority computing device 104 includes some or all of the functions of attribute authority computing device 106 (e.g., in an implementation where an attribute authority is also a publishing authority, or a computing device is shared by a publishing authority and an attribute authority). Furthermore, DB host 102 may be integrated with publishing authority computing device 104 and/or attribute authority computing device 106, in an alternative embodiment. Moreover, verification system 110 may be a sub-system of DB host 102, publishing authority computing device 104, and/or attribute authority computing device 106, in an alternative embodiment.

As shown in FIG. 1, DB host 102 executes a ledger database 112. Ledger database 112 provides tamper-evidence capabilities for database tables of ledger database 112 (referred to as ledger tables), where one can cryptographically attest to other parties, such as auditors or other parties that the data maintained by the database has not been tampered with. Ledger database 112 protects data from any attacker or high-privileged user, including database administrators, system administrators, and cloud administrators. As with a traditional ledger, historical data is preserved. If a row is updated in a ledger table, its previous value is maintained and protected in a history table. Ledger database 112 provides a chronicle of all changes made to the database over time. In accordance with an embodiment, historical data is maintained in a relational form to support queries (e.g., SQL queries) for auditing, forensics, and other purposes.

Any rows modified by a transaction in a ledger table is cryptographically hashed (e.g., SHA-256 hashed) using a data structure, such as a $1e$ tree, that creates a root hash representing all rows in the transaction. The transactions that ledger database 112 processes are then also hashed together through a Merkle tree data structure. The result is a root hash that forms a block. The block is then hashed through the root hash of the block, along with the root hash of the previous block as input to the hash function. That hashing forms a blockchain. The root hashes, also referred herein as database digests, contain the cryptographically hashed transactions and represent the state of the database at the time the digests were generated. In accordance with an embodiment, the digests are periodically generated and stored outside the database in tamper-proof storage. Digests are later used to verify the integrity of the database by comparing the value of the hash in the digest against the calculated hashes in database.

Materialized views of ledger tables are generated in fixed periodic intervals referred to as epochs. Ledger database 112 also provides forward integrity, which guarantees that given a materialized view of a ledger table at any time t, it is infeasible to tamper the ledger table in any subsequent epoch.

Ledger database 112 stores and protects any type of data or information, including, but not limited to a verifiable identity map 114 and a verifiable attribute map 120. Verifiable identity map 114 stores an identity for each of a plurality of users (e.g., members, employees, etc.), for example, of an entity. Each identity comprises information that uniquely identifies the user within the entity. Examples of the identity include, but are not limited to, the user's email address, the user's phone number, the user's username, or any other type of information that uniquely identifies the user. Identity map 114 also stores, for each user, a public signing key of the user in association with the identity of the user.

Each entity maintains and/or publishes their own identity map comprising identities and public key(s) for members of the entity. As such, each entity acts as their own identity or certification authorities. Using the identity maps, a member of one entity can establish a secure channel with a member of another entity.

For example, as shown in FIG. 1, identity map 114 stores identities of users in a column 116 of identity map 114 and public signing keys of the users in a column 118 of identity map 114. The entity that maintains and/or publishes identity map 114 signs identity map 114 using its own private signing key. This initial identity map 114 is considered to be trusted and verifiable, as the binding between respective identities and public signing keys is signed by the private signing key of the entity and is verifiable using the public signing key corresponding to the private signing key of the entity.

In accordance with an embodiment, the public signing keys collected for the members are stored on and/or obtained from the computing devices 108A-108N thereof. For instance, as shown in FIG. 1, each of computing devices 108A-108N stores a respective user key pair 136A-136N, which includes a private user signing key and a public user signing key. The user key pairs 136A-136N are generated by a trusted or customer-controlled service. In accordance with an embodiment, each of user key pairs 136A-136N comprises randomly-generated numbers (e.g., the service comprises a random number generator that generates user key pairs 136A-136N). In accordance with an embodiment, the service executes locally on each of computing devices 108A-108N. In accordance with another embodiment, the service executes remotely from computing devices 108A-108N. In accordance with such an embodiment, user key pairs 136A-136N are generated from a key generating web service, where computing devices 108A-108N submit a request to the service for a user key pair. Responsive to receiving the request, the service generates (e.g., randomly) the user key pair and provides the generated key pair to the requesting computing device via a response. In accordance with an embodiment, the service is a Proof of Possession (PoP)-based service; although it is noted that the embodiments described herein are not so limited.

In accordance with an embodiment, each of user key pairs 136A-136N expire after a predetermined time period. For instance, a key pair may expire after a certain number of minutes, hours, days, weeks, months, or years. Alternatively, attribute authority key pair 134 may include a long-term key pair and a short-term key pair, where the long-term key pair expires after a certain number of days, weeks, months, or years and the short-term key pair expires after a certain number of minutes, hours, or days.

The private user signing keys of user key pairs 136A-136N are respectively stored locally in a secure environment of a computing device of computing devices 108A-108N. Examples of a secure environment include, but are not limited to, a trusted platform module (TPM), a hardware security module (HSM), or any type of secure hardware and/or software-based cryptoprocessor.

In accordance with an embodiment, identity map 114, or another identity map of ledger database 112, stores identities and signing keys of publishing authorities and/or attribute authorities. For example, ledger database 112 may include an authority identity map, not shown in FIG. 1 for brevity. The authority identity map may include identities and associated public keys for publishing and attribute authorities of an entity. For instance, as shown in FIG. 1, publishing authority computing device 104 stores a publishing authority key pair 132, which includes a private signing key and a public signing key of a publishing authority corresponding to publishing authority computing device 104. Furthermore, attribute authority computing device 106 stores an attribute authority key pair 134, which includes a private signing key and a public signing key of an attribute authority corresponding to attribute authority computing device 106. Keys of publishing authority key pair 132 and attribute authority key pair 134 may be generated and provided in a manner similar to those described with respect to user key pairs 136A-136N above.

Attribute map 120 stores a reference to an identity for each of a plurality of users of an entity. Examples of a reference to an identity include, but are not limited to, a copy of an identity stored in an identity map (e.g., identity map 114), a link to an identity stored in an identity map (e.g., identity map 114), a location within an identity map (e.g., an entry, a row, and/or a column within identity map 114), or any other type of data that uniquely references an identity of a user. Attribute map 120 also stores, for each user, one or more attributes associated with (e.g., assigned to) a user in association with the reference to the identity of the user. In accordance with an embodiment, attribute map 120 also stores, for each user, one or more secrets associated with attributes associated with the respective user.

An entity that acts as an attribute authority (or a publishing authority on behalf of or jointly with one or more attribute authorities) maintains and/or publishes their own attribute map comprising references to identities and attributes for users associated with attributes managed by the entity. Using attribute maps, an attribute authority of an entity can grant attributes to a member of the entity or another entity, as further described below. Furthermore, attribute maps can be used to verify a member of an entity should be authorized to access protected information, as further described below.

To initially generate attribute map 120, an entity obtains references to identities of users and stores the references in a column 122 of attribute map 120 that stores the references to the identities. The entity associates (e.g., assigns) attributes to one or more users and stores the attributes in a column 124 of attribute map 120 that stores attributes. The entity then signs attribute map 120 using its own private signing key. This initial attribute map is considered to be trusted and verifiable, as the binding between respective identities and attributes is signed by the private signing key of the entity and is verifiable using the public signing key corresponding to the private signing key of the entity. In a further embodiment, the attribute map is signed by a publishing authority (e.g., a parent entity of the entity, a partner entity of the entity, or another entity associated with the management of attribute map 120). In an example embodiment, the initial attribute map includes one or more initial attributes associated with users in column 124. Alternatively, column 124 of the initial attribute map includes no attributes associated with users.

While identity map 114 and attribute map 120 are illustrated as separate maps in FIG. 1, it is also contemplated that identity map 114 and attribute map 120 may be incorporated into a single map (i.e., an identity and attribute map). Furthermore, as will be discussed below with respect to FIG. 12, an attribute map may reference identities stored in more than one identity map. Further still, attribute map 120 and identity map 114 need not be executed by the same ledger database, nor managed by the same entity, in embodiments.

Ledger database 112 provides users of publishing authority computing device 106, attribute authority computing device 106, and computing devices 108A-108N access to a digest, which is representative of the state of ledger database 112 (including identity map 114 and/or attribute map 120). For example, as shown in FIG. 1, publishing authority computing device 104 stores digest 126, attribute authority computing device 106 stores digest 128, computing device 108A stores digest 130A, and computing device 108N stores digest 130N. Each of digests 126, 128, and 130A-130N are copies of the same digest made accessible by DB host 102. Additional details regarding ledger database 112 are provided below with reference to FIG. 2. It is noted that in embodiments, ledger database 112 provides users of publishing authority computing device 104, attribute authority computing device 106, and/or computing devices 108A-108N access to some or all of the digests that are generated by ledger database 112 over time. While FIG. 1 illustrates ledger database 112 including identity map 114 and attribute map 120, it is also contemplated herein that ledger database 112 may alternatively or additionally include an identity map that is referenced by one or more attribute maps external to ledger database 112 and/or an attribute map that references one or more identity maps external to ledger database 112. In another alternative embodiment, ledger database 112 provides users of publishing authority computing device 106, attribute authority computing device 106, and computing devices 108-108N access to a first digest corresponding to identity map 114 and a second digest corresponding to attribute map 120.

Verification system 110 verifies a user is authorized to access protected information based on attribute information stored in attribute map 120. For example, one of computing devices 108A-108N may submit a request on behalf of a respective user to access protected information to DB host 102. DB host 102 communicates with verification system 110 to determine whether or not the user should have access to the protected information. For example, DB host 102 in accordance with an embodiment communicates with verification system 110 to determine whether or not an identity (or reference thereto) of the user is associated with attributes specified by a security policy in attribute map 120. Additional details regarding verification system 110 will be discussed further below with reference to FIGS. 7 and 8.

Figure 2:
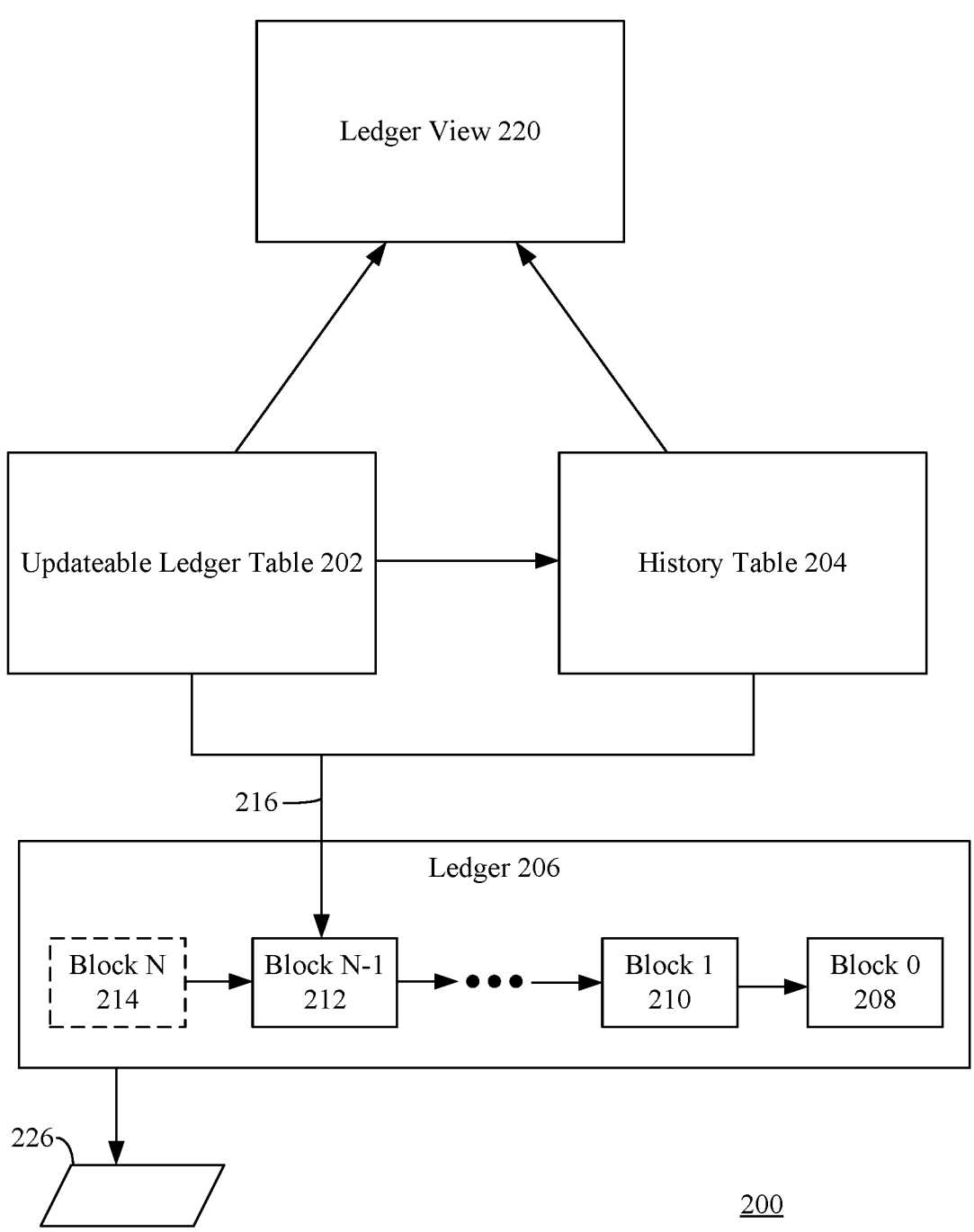
FIG. 2 shows a block diagram of a ledger database in accordance with an example embodiment.

FIG. 2 shows a block diagram of a ledger database 200 in accordance with an example embodiment. Ledger database 200 is an example of ledger database 112, a described above with reference to FIG. 1. As shown in FIG. 2, ledger database 200 comprises at least a current (or updateable) ledger table 202, a history table 204, and a ledger 206.

Current table 202 includes entries (or rows) of data, each entry having a number of columns (e.g., columns 114 and 116, as shown in FIG. 1). Current table 202 exemplarily includes, for illustrative purposes, an identity map (e.g., identity map 114, as shown in FIG. 1). Likewise, history table 204 includes similar, or the same, columns for rows of entries therein, but the rows of history table 204 include data reflecting each transaction that changes data in current table 202 (e.g., modify, delete, etc.). For example, if a row is updated in the database, its previous value is maintained and protected in history table 204.

Ledger 206 is a cryptographic data structure that comprises a blockchain. Ledger 206 includes a number of blocks having block IDs: a genesis block 208 (ID 'Block 0'), a first block 210 (ID 'Block 1'), etc., up to a current block 212 (ID 'Block N–1'), and it should be noted that additional blocks such as a future block 214 (ID 'Block N') may be generated for maintenance of the blockchain as additional entries are changed in current table 202 and prior entries are reflected in history table 204. Each block of the blockchain of ledger 206 includes at least a block ID, a hash value of the immediately preceding block (e.g., a SHA-256-based hash), and a root hash value representative of all the rows of the database post-update (e.g., a SHA-256 hash generated via a Merkle tree data structure), according to embodiments.

In the initial state of ledger 206, genesis block 208 (ID Block '0') has no meaningful prior hash value (zero) stored.

However, after some time period in which transactions affect entries in current table 202 and history table 204, first block 210 (ID 'Block 1') is generated and completed which stores the hash value over 'Block 0'.

The root hash value of the latest block (e.g., current block 212) in ledger 206 is referred to as a digest (shown as digest 226), which captures a validity state of current table 202, history table 204, and ledger 206. In this way, a single hash value, e.g., in digest 218, enables verification to be performed on data in the database, e.g., in current table 202, history table 204, and ledger 206, that was present at and before generation of digest 226. Digest 226 is stored in secure storage and/or published (e.g., via a website) for use by users of publishing authority computing device 104, attribute authority computing device 106, and computing devices 108A-108N (as shown in FIG. 1).

As an example, suppose Block N–2 is the current block in ledger 206 and a transaction is received to update current table 202. In this example, history table 204 is updated to store the information stored in current table 202, and current table 202 is updated in accordance with the transaction. A new block in ledger 206 for the transaction is generated (e.g., current block 212). A transaction hash value 216 is then generated over the entry in history table 204 and a changed entry in current table 202 that is generated by the transaction that was performed on the entry. Transaction hash value 216 is inserted into block 212. To generate the root hash value, the updated rows are inserted as leaf nodes of a hierarchical hash data structure, such as a Merkle tree. Each leaf node is then hashed (e.g., SHA-256 hashed) to generate a hash value for the leaf nodes. For each node that is not a leaf, a hash value is generated therefor that is based on the hash values of its child nodes. A root hash value of the hierarchical hash data structure (e.g., a root hash value of the root node of the hierarchical hash data structure) is then determined based on the hash values of its child nodes and utilized as the root hash value (and digest 218) stored in current block 212.

It is noted that any given block comprises any number of transactions. A new block is generated responsive to one or more events, including, but not limited to, expiry of a predetermined time period (e.g., 30 seconds), when a block reaches a maximum number of transactions (e.g., 100,000), etc.

Additionally, with respect to FIG. 2, embodiments provide for a view of a ledger (i.e., a ledger view table 220) that comprises a union of current table 202 and history table 204. Ledger view table 220 is queryable or otherwise operatable via database operations and thus, provides a consolidate view of the current state of the data as well as all transactions previously performed on the current table.

Figure 3:
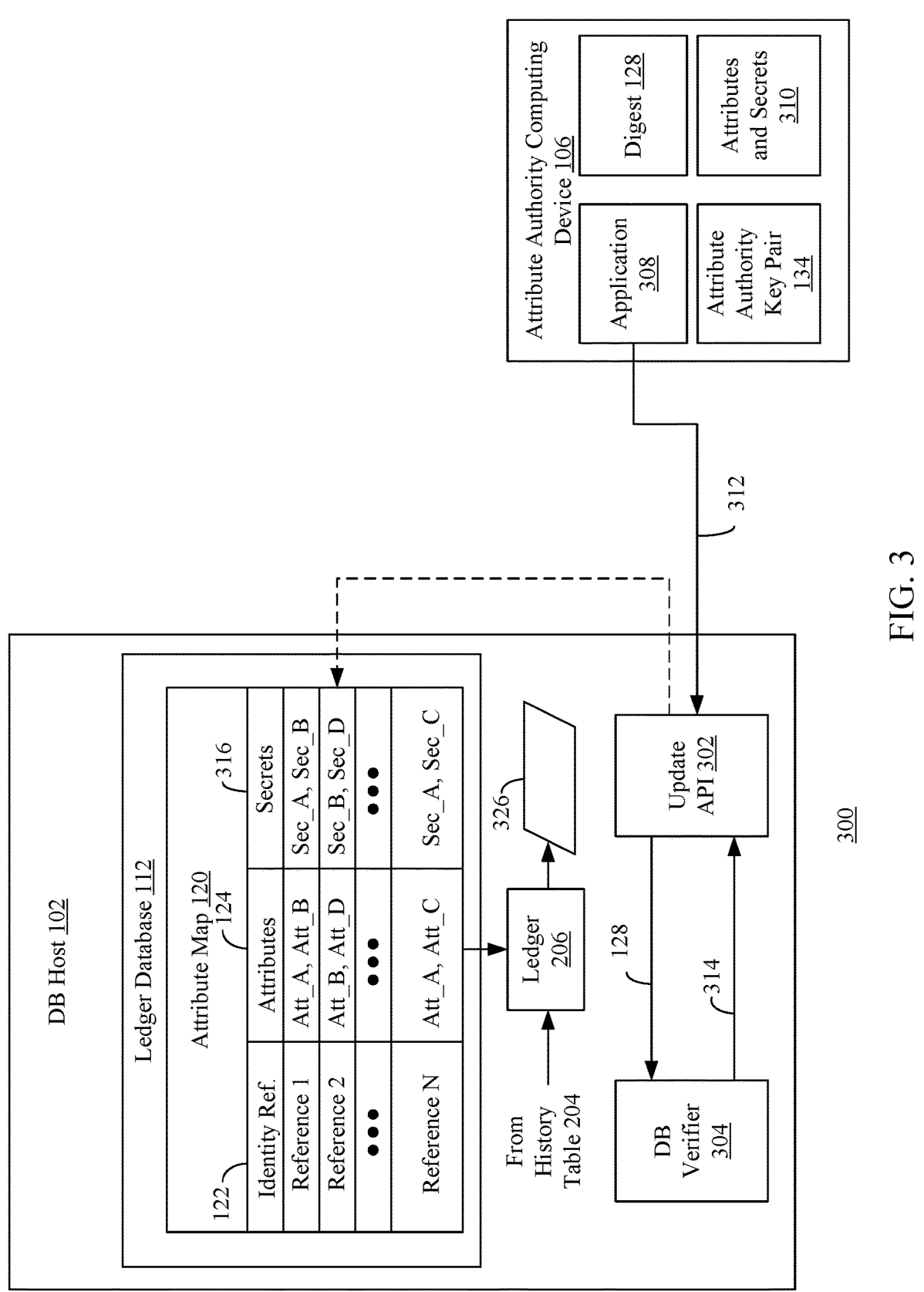
FIG. 3 shows a block diagram of a system that updates an attribute map in accordance with an example embodiment.

Referring again to FIG. 1, systems, computing devices, and computer readable storage mediums described herein may modify information of attribute map 120 to include new information in various ways, in embodiments. For example, FIG. 3 shows a block diagram of a system 300 that updates an attribute map in accordance with an example embodiment. As shown in FIG. 3, system 300 comprises DB host 102 and attribute authority computing device 106, a described above with reference to FIG. 1. DB host 102 executes ledger database 112 comprising attribute map 120 and comprises ledger 206, an update application programming interface (API) 302 and a database verifier 304 ("DB verifier 304" hereinafter). As shown in FIG. 3, ledger database 112 comprises attribute map 120; however, ledger database 112 may also include identity map 114, additional identity maps, and/or additional attribute maps, not shown in FIG. 3 for brevity. As also shown in FIG. 3, attribute authority computing device 106 comprises attribute authority key pair 134, digest 128, an application 308, and attributes and secrets 310. For illustrative purposes, system 300 is described below with respect to FIG. 4A. FIG. 4A shows a flowchart 400 of a process for updating an attribute map in accordance with an example embodiment. System 300 may operate according to flowchart 400 in embodiments. Not all steps of flowchart 400 need be performed in all embodiments. Further structural and operational embodiments will be apparent to persons skilled in the relevant art(s) based on the following description of FIGS. 3 and 4A.

Application 308 is any software application in which a user of attribute authority computing device 106 (e.g., a database administrator, system administrator, cloud administrator, publishing administrator, or any other type of user with the authority to associate attributes with users) utilizes the application on behalf of the attribute authority to manage attributes associated with users corresponding to references to identities stored in column 122 of attribute map 120.

Attributes and secrets 310 comprise attributes and corresponding secrets that are managed by an attribute authority (e.g., an administrator or entity) corresponding to attribute authority computing device 106. In accordance with an embodiment, attributes and secrets 310 includes a table that maps attributes to corresponding secrets. Attributes and secrets 310 are stored locally in a secure environment of attribute authority computing device 106. Alternatively, attributes and secrets 310 are remotely stored in a secure environment accessible by attribute authority computing device 106. Examples of a secure environment include, but are not limited to, a trusted platform module (TPM), a hardware security module (HSM), or any type of secure hardware and/or software-based cryptoprocessor.

A user of attribute authority computing device 106 ("attribute authority user" herein) is enabled to update information stored in attribute map 120 utilizing update API 302. Examples of information that is updateable includes, but is not limited to, references to identities of users, attributes associated with a user, and/or secrets associated with a user. In accordance with an embodiment, attribute map 120 is configured such that only the attribute authority user is allowed to update attribute map 120. This is achieved by signing the attribute map with the attribute authority's private signing key, for example by an application (e.g., application 308). This advantageously prevents rogue users from tampering with attributes associated with the users referenced in attribute map 120. For instance, a user corresponding to the identity referenced by "Reference 1" in column 122 of attribute map 120 is prevented from associating attributes with themselves in order to access protected information they are otherwise unauthorized to access, as described elsewhere herein.

As stated above, flowchart 400 is a flowchart of a process for updating an attribute map. Flowchart 400 begins with step 402. In step 402, a first request is received from a first computing device on behalf of an entity to update an attribute map maintained by a ledger database. The first request comprises a first digest representative of a state of the ledger database and a first attribute of a user. The attribute map comprises a reference to an identity of the user. For example, update API 302 receives a request 312 from attribute authority computing device 106 to update attribute map 120 maintained by ledger database 112. Request 312 includes updated attribute information generated by, for example, application 308 and signed with the attribute authority's private key (e.g., by application 308). The updated attribute information includes attributes and/or secrets to be associated with a reference to the identity of the user stored in attribute map 120. In accordance with an embodiment, the updated attribute information includes the identity of the user corresponding to the reference to the identity of the user stored in attribute map 120. In accordance with another embodiment, the updated attribute information includes an indication of a location in the attribute map that the reference of the identity of the user is stored in (e.g., a column number and row number of a table). Alternatively, the identity of the user or indication are included in request 312 separate from the updated attribute information.

In accordance with one or more embodiments, the reference to the identity of the user includes a reference to an identity of a user stored in an identity map (e.g., identity map 114 of FIG. 1). For example, with reference to FIG. 2, Reference 2 stored in column 122 of attribute map 120 comprises a reference to User Identity 2 stored in column 116 of identity map 114 of FIG. 1.

In accordance with an embodiment, request 312 includes digest 128, which is representative of a state of ledger database 112 (including attribute map 120), and the signed updated attribute information. In accordance with another embodiment, digest 128 and the signed updated attribute information are included in separate requests received from attribute authority computing device 106. It is noted in embodiments update API 302 receives a plurality of digests via request(s), where the plurality of digests comprises some or all of the digests previously generated by ledger 206.

In step 404, the ledger database is validated based on the first digest. For example, DB verifier 304 validates ledger database 112 based on digest 128 received from attribute authority computing device 106 in step 402. As shown in FIG. 3, update API 302 provides digest 128 to DB verifier 304. DB verifier 304 validates ledger database 112 based on digest 128 to determine whether ledger database 112 has been tampered with. For example, DB verifier 304 generates a hierarchical hash data structure, such as a Merkle tree, based on the rows of tables (e.g., attribute map 120) of ledger database 112. For instance, DB verifier 304 generates a leaf node for each row of ledger database 112, where each leaf node comprises the contents of the corresponding row. DB verifier 304 then hashes each leaf node to generate a hash value for the leaf nodes. For instance, the contents of the leaf node are input into a hash function, which outputs the hash value. For each node that is not a leaf, DB verifier 304 generates a hash value therefor that is based on the hash values of its child nodes. For instance, for a given node that is not a leaf, the hash values of its child nodes are input into a hash function, which outputs the hash value therefor. DB verifier 304 then generates a root hash value of the hierarchical hash data structure (e.g., a root hash value of the root node of the hierarchical hash data structure) based on the hash values of its child nodes. For instance, the hash values of its child nodes are input into a hash function, which outputs the root hash value.

DB verifier 304 then compares the determined root hash value to digest 128 received via request 312. If the determined root hash value is equal to digest 128, then DB verifier 304 determines that ledger database 112 has not been tampered with and provides a notification 314 to update API 302 indicating that ledger database 112 has not been tampered with.

If the determined root hash value is not equal to digest 128, then DB verifier 304 determines that ledger database 112 has been tampered with and issues a notification to update API 302. In accordance with an embodiment, responsive to receiving the notification, update API 302 returns an error message to application 308 indicating that ledger database 112 has been tampered with and/or the attribute information was not successfully stored in attribute map 120.

In accordance with an embodiment where some or all previously-generated digests are provided to update API 302, DB verifier 304 verifies all such digests. This way, if an attacker manages to compromise ledger database 112 prior to the latest digest being generated and provides attribute authority computing device 106 with that digest, DB verifier 304 will still be able to verify that the ledger database 112 was compromised. Additional details regarding validating ledger database 112 are described below with reference to FIGS. 9-11.

In step 406, in response to said validating in step 404, the first attribute is associated in the attribute map with the reference to the identity of the user. For example, in response to receiving notification 314 from DB verifier 304, update API 302 provides the signed updated attribute information to ledger database 112. Using a public signing key of the attribute authority (not shown in FIG. 3), ledger database 112 verifies that the signed updated attribute information was signed using the attribute authority's private signing key. If ledger database 112 determines that the updated attribute information was signed using the attribute authority's private signing key, ledger database 112 updates attribute map 120 to associate the attribute information (e.g., attributes and/or secrets) included in the signed updated attribute information with corresponding references to identities of users. For instance, DB host 102 stores an attribute "Att_D" and a secret "Sec_D" in respective columns 124 and 316 of attribute map 120 corresponding to a reference to an identity of a user "Reference 2" in column 122 of attribute map 120. This way, Att_D and Sec_D are associated with Reference 2.

If ledger database 112 determines that the updated attribute information was not signed using the attribute authority's private signing key, ledger database 112 does not update attribute map 120 with the updated attribute information. In accordance with an embodiment, update API 302 returns an error message to application 308 indicating that the updated attribute information was not successfully stored in attribute map 120.

In step 408, a second digest representative of the state of the ledger database after associating the first attribute with the reference to the identity of the user is generated. For example, after some time, ledger 206 of DB host 102 generates an updated digest 326 representative of the state of ledger database 112 after associating the attribute information with the reference to the identity of the user in step 406. Updated digest 326 is generated in a similar manner as described above with reference to FIG. 2 based on attribute map 120 (which is stored in updateable ledger table 202, as shown in FIG. 2) and history table 204 (as also shown in FIG. 2).

In step 410, the entity is provided access to the second digest. For example, the attribute authority user of attribute authority computing device 106 is provided access to updated digest 326 generated in step 408. In accordance with an embodiment, the entity that maintains attribute map 120 publishes updated digest 326, for example, via a web page that is accessible to attribute authority computing device 106. In accordance with another embodiment, attribute authority computing device 106 obtains updated digest 326 from DB host 102. For example, DB host 102 provides a request (not shown in FIG. 3) comprising updated digest 326 to attribute authority computing device 106, and attribute authority computing device 106 store updated digest 326, for example, in a memory thereof. In another example, attribute authority computing device 106 provides a request to DB host 102 for updated digest 326, and DB host 102 provides a response that includes digest 326 to attribute authority computing device 106. It is noted that in embodiments DB host 102 provides access to some or all digests that are generated by ledger database 112 over time.

As described herein, update API 302 provides signed updated attribute information to ledger database 112, which verifies the signed updated attribute information and updates attribute map 120. Updating attribute map 120 may include associating secrets with a reference to an identity. For instance, FIG. 4B shows a flowchart 420 of a process for associating a secret with a reference to an identity in accordance with an embodiment. In an embodiment, DB host 102 of FIG. 3 operates to perform the step of flowchart 420. Flowchart 420 is described as follows with respect to system 300 of FIG. 3. Further structural and operational embodiments will be apparent to persons skilled in the relevant art(s) based on the following description. Note that flowchart 420 need not be performed in all embodiments.

Flowchart 420 includes step 422, which may be a substep of step 406 of flowchart 400 described above with respect to FIG. 4A. In step 422, a secret corresponding to the first attribute is associated with the reference to the identity of the user. For example, the signed updated attribute information received by update API 302 includes a secret(s) corresponding to the attribute(s) included therein. If ledger database 112 determines that the updated attribute information was signed using the attribute authority's private signing key, ledger database 112 updates attribute map 120 to associate the secret(s) included in the signed updated attribute information with corresponding references to identities of users. For instance, DB host 102 stores a secret "Sec_D" in column 316 of attribute map 120 corresponding to a reference to an identity of a user "Reference 2" in column 122 of attribute map 120. This way, Sec_D is associated with Reference 2.

Figure 5:
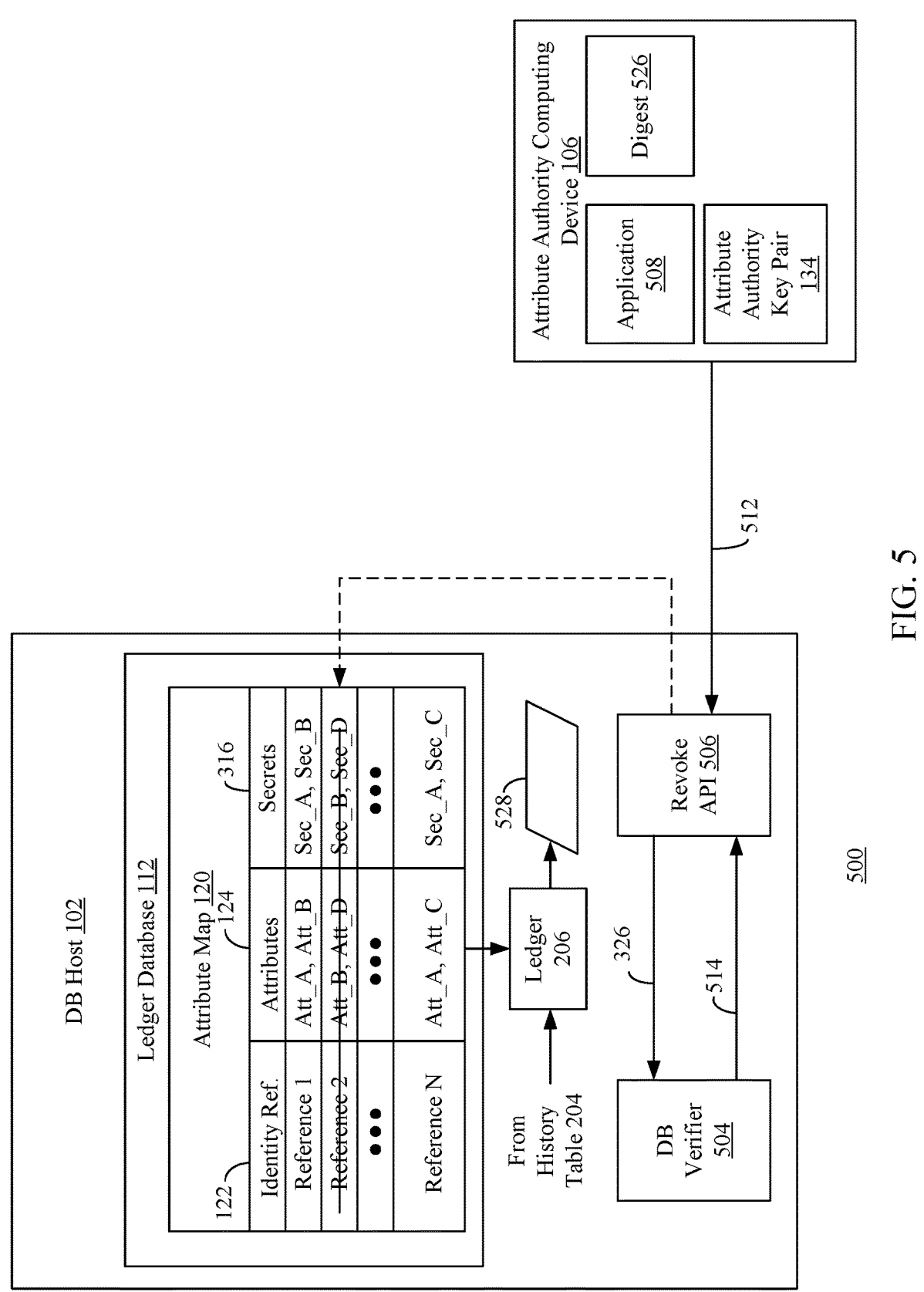
FIG. 5 shows a block diagram of a system that removes information from an attribute map in accordance with an example embodiment.
Figure 6:
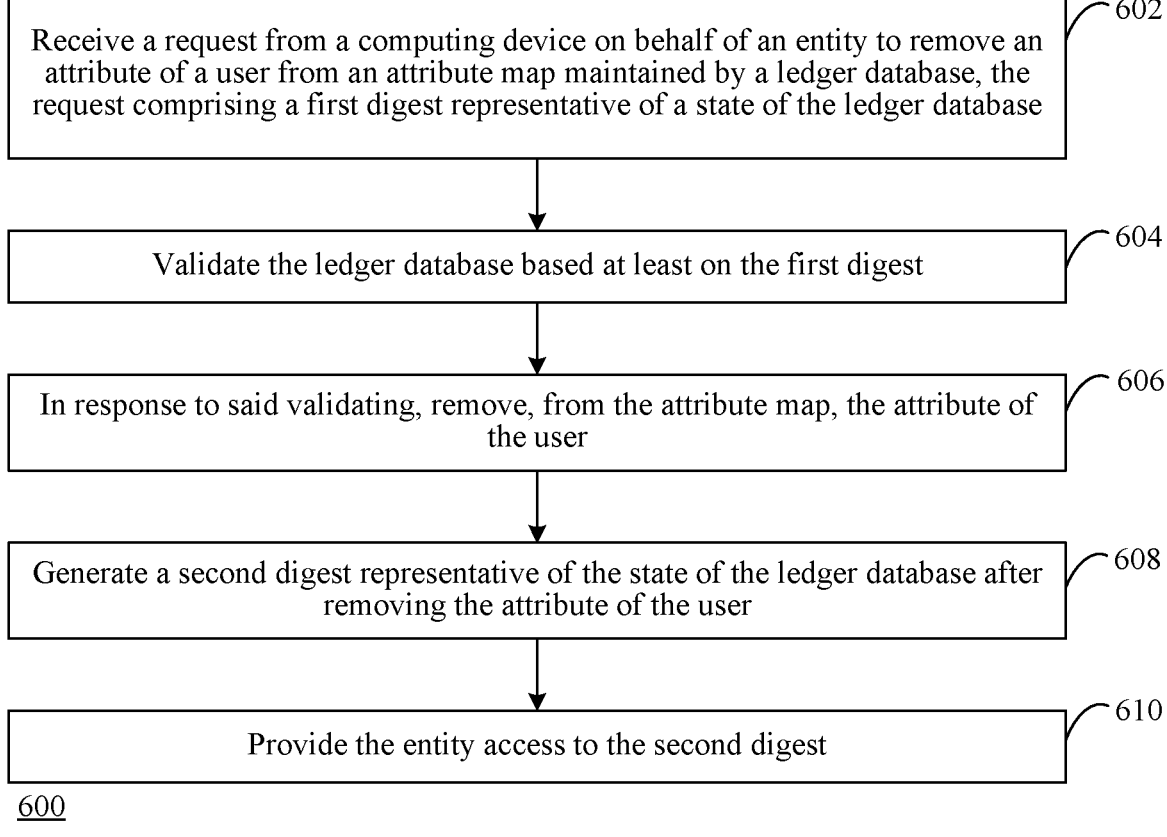
FIG. 6 shows a flowchart for removing information from an attribute map in accordance with an example embodiment.

Referring again to FIG. 1, systems, computing devices, and computer readable storage mediums described herein may be configured to modify information of attribute map 120 to remove information in various ways, in embodiments. For example, an administrator would remove (or revoke) a reference to an identity and/or associated attributes and/or secrets of a user from attribute map 120 of FIG. 1 in the event that the other user is no longer part of the entity or should otherwise no longer be associated with a particular attribute and/or secret. In accordance with an embodiment, an administrator is enabled to remove information stored in identity map utilizing a revoke API. For instance, FIG. 5 shows a block diagram of a system 500 that removes information from an attribute map in accordance with an example embodiment. As shown in FIG. 5, system 500 comprises attribute authority computing device 106 and DB host 102, as described above with reference to FIG. 1. DB host 102 executes ledger database 112 comprising attribute map 120 and comprises ledger 206, a revoke API 506 and a database verifier 504 ("DB verifier 504" herein after). Attribute authority computing device 106 comprises attribute authority key pair 134, digest 526, and an application 508. Digest 526 is an example of digest 326, as described above with reference to FIG. 3. Application 508 is a software application that is utilized to access DB host 102. In an embodiment in which attribute map 120 is accessible over a network, application 508 is a browser application (e.g., Microsoft Edge™ published by Microsoft Corporation). For illustrative purposes, system 500 is described below with respect to FIG. 6. FIG. 6 shows a flowchart 600 of a process for removing information from an attribute map in accordance with an example embodiment. System 500 may operate according to flowchart 600 in embodiments. Not all steps of flowchart 600 need be performed in all embodiments. Further structural and operational embodiments will be apparent to persons skilled in the relevant art(s) based on the following descriptions of FIGS. 5 and 6.

Flowchart 600 begins with step 602. In step 602, a request is received from a computing device on behalf of an entity to remove an attribute of a user from an attribute map maintained by a ledger database. The request comprises a first digest representative of a state of the ledger database. For example, revoke API 506 of FIG. 5 receives a request 512 from application 508 on behalf of an attribute authority. In accordance with an embodiment, request 512 includes attribute revocation information generated by, for example, application 508 and signed with the attribute authority's private key (e.g., by application 508). The attribute revocation information includes an indication of which attribute(s) and/or secret(s) are to be revoked and the identity (or a reference thereto) of the user for which the attribute(s) and/or secret(s) are to be revoked.

In accordance with an embodiment, request 512 comprises digest 526, which is representative of a state of ledger database 112, and the signed attribute revocation information. In accordance with another embodiment, digest 526 and the signed attribute revocation information are included in separate requests received from attribute authority computing device 106. It is noted in embodiments that a plurality of digests is provided to revoke API 506 via request(s), where the plurality of digests comprises some or all of the digests previously generated by ledger 206.

In step 604, the ledger database is validated based at least on the first digest. For example, DB verifier 504 validates ledger database 112 based at least on digest 528 received from attribute authority computing device 106 in step 602. DB verifier 504 is an example of DB verifier 304, as described above with reference to FIG. 3. As shown in FIG. 5, revoke API 506 provides digest 528 to DB verifier 504. DB verifier 504 validates ledger database 112 based on digest 528 in a manner similar to DB verifier 304, as described above with reference to FIGS. 3 and 4. If DB verifier 504 determines that ledger database 112 has not been tampered with, DB verifier 504 provides a notification 514 to revoke API 506 indicating that ledger database 112 has not been tampered with.

If DB verifier 504 determines that ledger database 112 has been tampered with, DB verifier 504 issues a notification to revoke API 506. In accordance with an embodiment, responsive to receiving the notification, revoke API 506 returns an error message to application 508 indicating that ledger database 112 has been tampered with and/or the reference to the identity, the attribute, and/or the secret were not successfully removed from attribute map 120.

In accordance with an embodiment where some or all previously-generated digests are provided to revoke API 506, DB verifier 504 verifies all such digests. This way, if an attacker manages to compromise ledger database 112 prior to the latest digest being generated and provides computing device 502 with that digest, DB verifier 504 will still be able to verify that the ledger database 112 was compromised. Additional details regarding validating ledger database 112 are described below with reference to FIGS. 9-11.

In step 606, in response to said validating in step 604, the attribute of the user is removed from the attribute map. For example, in response to receiving notification 512 from DB verifier 504, revoke API 506 provides the signed attribute revocation information included in request 512 to ledger database 112. Using a public signing key of the attribute authority (not shown in FIG. 3), ledger database 112 verifies that the signed attribute revocation information as signed using the attribute authority's private signing key. If ledger database determines that the attribute revocation information was signed using the attribute authority's private signing key, ledger database 112 searches for an entry (or row) of attribute map 120 that comprises the reference to an identity included in request 512. In the example shown in FIG. 5, the identity corresponds to Reference 2 in column 122. After locating the entry, ledger database 112 removes the one or more attributes and/or one or more secrets associated therewith, as indicated by the attribute revocation information. In accordance with an embodiment, request 512 specifies which attributes and/or secrets are to be removed.

In accordance with one or more embodiments, the reference to the identity of the user and at least one of the attributes or secrets associated therewith are removed from the identity map. For example, as shown in FIG. 5, ledger database 112 removes Reference 2, attributes ATT_B and ATT_D, and secrets Sec_B and Sec_D from attribute map 120.

If ledger database 112 determines that the attribute revocation information was not signed using the attribute authority's private signing key, ledger database 112 does not revoke the reference to the identity, attribute and/or secret from attribute map 120. In accordance with an embodiment, revoke API 506 returns an error message to application 508 indicating that the reference to the identity and/or the associated attribute(s) and/or secret(s) were not successfully removed from attribute map 120.

In step 608, a second digest representative of the state of the ledger database after removing the attribute of the user is generated. For example, after some time, ledger 206 of DB host 102 generates an updated digest 528 representative of the state of the ledger database after removing the attribute of the user in step 606. Updated digest 528 is generated in a similar manner as described above with reference to FIG. 2 based on attribute map 120 (which is stored in updateable ledger 202, as shown in FIG. 2) and history table 204 (as also shown in FIG. 2). As described above with reference to FIG. 2, the information removed from attribute map 120 is retained via history table 204.

In step 610, the entity is provided access to the second digest. For example, the attribute authority user of attribute authority computing device 106 is provided access to update digest 326 generated in step 408. In accordance with an embodiment, the entity that maintains attribute map 120 publishes updated digest 528, for example, via a web page that is accessible to attribute authority computing device 106. In accordance with another embodiment, attribute authority computing device 106 obtains updated digest 528 from DB host 102. For example, DB host 102 provides a request (not shown in FIG. 5) comprising updated digest 528 to attribute authority computing device 106, and attribute authority computing device 106 store updated digest 528, for example, in a memory thereof. In another example, attribute authority computing device 106 provides a request to DB host 102 for updated digest 528, and DB host 102 provides a response that includes digest 528 to attribute authority computing device 106. It is noted that in embodiments DB host 102 provides access to some or all digests that are generated by ledger database 112 over time.

Figure 7:
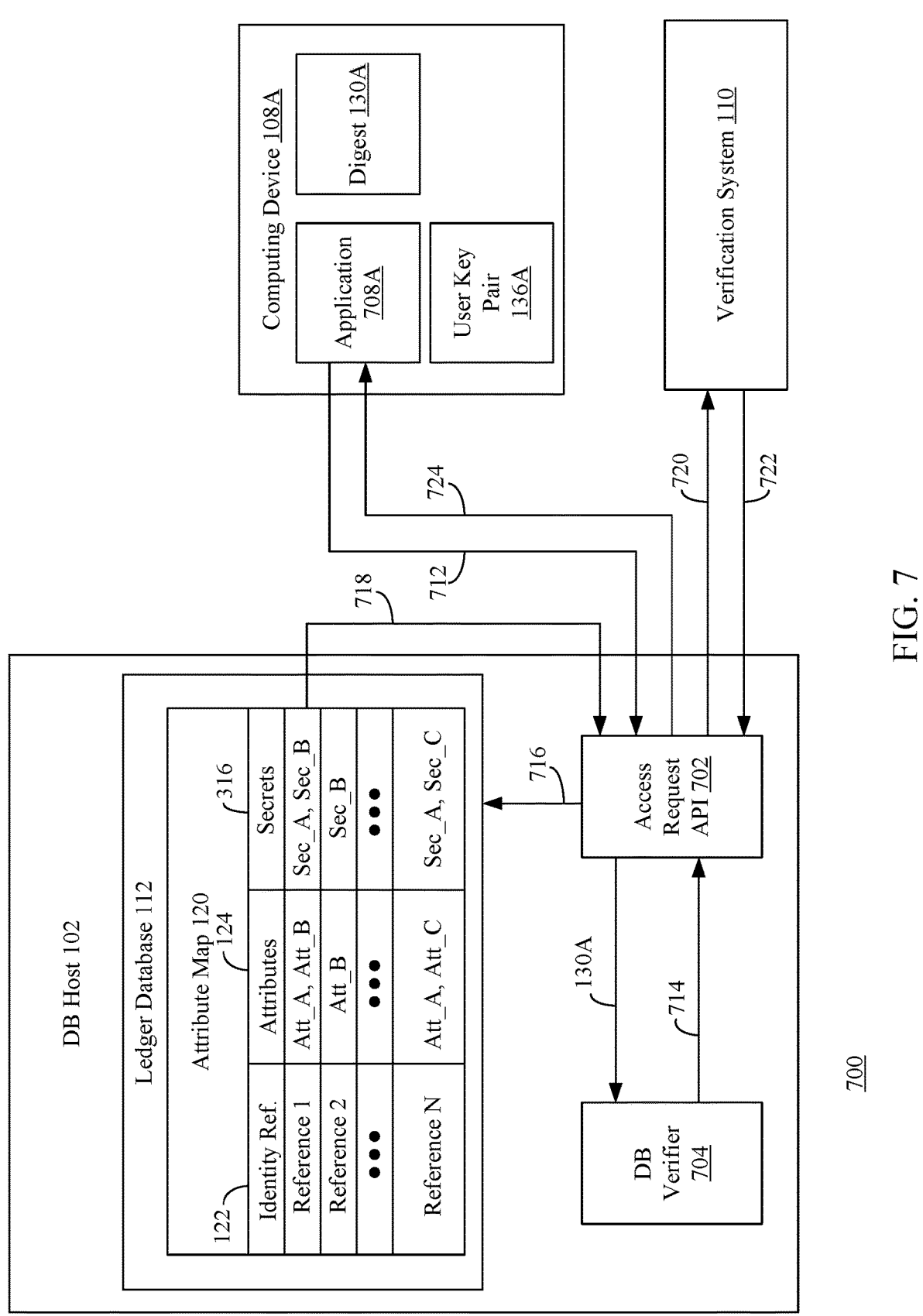
FIG. 7 shows a block diagram of a system that verifies access authorization of a user in accordance with an example embodiment.

Referring again to FIG. 1, systems, computing devices, and computer readable storage mediums described herein may enforce security policies to protect data in various ways, in embodiments. For example, FIG. 7 shows a block diagram of a system 700 that verifies access authorization of a user in accordance with an example embodiment. As shown in FIG. 7, system 700 comprises computing device 108A, DB host 102, and verification system 110, as described above with reference to FIG. 1. DB host 102 executes ledger database 112 comprising attribute map 120 and comprises ledger 206, an access request API 702, and a database verifier 704 ("DB verifier 704" hereinafter). As also shown in FIG. 7, computing device 108A comprises digest 130A, user key pair 136A, and an application 708A. Application 708A is any software application in which a user desires encryption, for example, for data sharing or communications. Examples of application 708A include, but are not limited to, Microsoft Teams™ published by Microsoft Corporation of Redmond, WA, Microsoft SharePoint™ published by Microsoft Corporation and/or the like. For illustrative purposes, system 700 is described below with respect to FIG. 8. FIG. 8 shows a flowchart 800 of a process for retrieving information from an attribute map in accordance with an example embodiment. System 700 may operate according to flowchart 800 in embodiments. Not all steps of flowchart 800 need be performed in all embodiments. Further structural and operational embodiments will be apparent to persons skilled in the relevant art(s) based on the following description of FIGS. 7 and 8.

Flowchart 800 begins with step 802. In step 802, a request is received from a computing device on behalf of a user to access data protected by a security policy. The request comprises a digest representative of a state of a ledger database and an identity associated with the user. The ledger database maintains an attribute map that comprises a reference to the identity associated with the user and attribute information of the user. For example, access request API 702 receives a request 712 from application 708A executing on behalf of a user associated with computing device 108A. Request 712 is a request to access data protected by a security policy. In accordance with an embodiment, request 712 comprises an identity (or a reference thereto) of the user for which access is being requested and digest 130A, which is representative of a state of ledger database 112. In accordance with another embodiment, the identity and digest 130A are included in separate requests to access request API 702. It is noted in embodiments that a plurality of digests is provided to access request API 702 via request (s), where the plurality of digests comprises some or all of the digests previously generated by ledger 206.

In step 804, the ledger database is validated based at least on the digest. For example, DB verifier 704 validates ledger database 112 based at least on digest 130A received from computing device 108A in step 602. DB verifier 704 is an example of DB verifier 304, as described above with reference to FIG. 3. As shown in FIG. 7, access request API 702 provides digest 130A to DB verifier 704. DB 704 validates ledger database 112 based on digest 130A in a manner similar to DB verifier 304, as described above with reference to FIG. 3. If DB verifier 704 determines that ledger database 112 has not been tampered with, DB verifier 704 provides a notification 714 to access request API 702 indicating that ledger database 112 has not been tampered with.

If DB verifier 704 determines that ledger database 112 has been tampered with, DB verifier 704 issues a notification to access request API 702. In accordance with an embodiment, responsive to receiving the notification, access request API

702 returns an error message to application 708A indicating that ledger database 112 has been tampered with and/or the request to access data protected by a security policy was not processed.

In accordance with an embodiment where some or all previously-generated digests are provided to access request API 702, DB verifier 704 verifies all such digests. This way, if an attacker manages to compromise ledger database 112 prior to the latest digest being generated and provides computing device 108A with that digest, DB verifier 704 will still be able to verify that the ledger database 112 was compromised.

In step 806, in response to said validating in step 804, the attribute information is located in the attribute map based on the identity of the user. For example, responsive to receiving notification 714 from DB verifier 704, access request API 702 generates a search query 716 and provides search query 716 to ledger database 112. Search query 716 comprises the identity specified by request 712. In accordance with an embodiment, search query 716 includes instructions to retrieve a subset of the attributes and/or secrets associated with a reference to an identity of a user. In accordance with an embodiment, access request API 702 determines the subset of attributes and/or secrets based on request 712 and the security policy that protects the data.

Ledger database 112 locates the attribute information in response to search query 716. For example, ledger database 112 searches for an entry (or row) of attribute map 120 that comprises the reference to an identity included in request 712. In the example shown in FIG. 5, the identity corresponds to Reference 1 in column 122 of attribute map 120. After locating the entry, ledger database 112 locates the attribute information requested in search query 716. For example, search query 716 in accordance with an embodiment includes instructions to retrieve a secret corresponding to Att_A and a secret corresponding to Att_B if Att_A and Att_B are associated with Reference 2. In this example, Sec_A is a secret corresponding to Att_A, and Sec_B is a secret corresponding to Att_B. Ledger database 112 locates Sec_A and Sec_B in column 316 corresponding to the entry of attribute map 120 that comprises Reference 1 and generates a response 718 including Sec_A and Sec_B.

In step 808, the attribute information is provided to a verification system. For example, ledger database 112 provides response 718 to access request API 702, which provides a verification request 720 to verification system 110. Verification request 720 includes the attribute information located in step 806. In the example shown in FIG. 7, verification request 720 includes Sec_A and Sec_B.

Verification system 110 is any type of verification system that verifies if a user is authorized to access data protected by a security policy associated with verification system 110. Examples of verification system 110 include, but are not limited to, an ABAC verification system, a zero-trust verification system, and a zero-trust ABAC verification system. In accordance with an embodiment, verification system 110 receives verification request 720 and, based on the included attribute information, verifies if the user is authorized to access data protected by the security policy. For example, verification system 110 in accordance with an embodiment determines (e.g., based on analyzing the security policy) access criteria of the security policy and determines based on the determined access criteria and the attribute information included in verification request 720 if the access criteria is met. Examples of access criteria of a security policy include, but are not limited to, being associated with certain attribute information (e.g., certain attributes and/or secrets), attesting an identity of the user, verifying location information, and/or any other criteria suitable for determining that a user should be authorized to access data protected by the security policy. If verification system 110 determines the user is authorized, verification system 110 provides a response 722. In accordance with an embodiment, response 722 includes a security policy key for decrypting the data protected by the security policy. In accordance with another embodiment, response 722 includes the data protected by the security policy. In accordance with another embodiment, response 722 is an indication that the user is authorized. In accordance with an embodiment, response 722 is encrypted with a public signing key of user key pair 136A.

If verification system 110 determines the user is not authorized (e.g., the attribute information included in verification request 720 is deficient), verification system 110 issues a notification to access request API 702. In accordance with an embodiment, responsive to receiving the notification, access request API 702 returns an error message to application 708A indicating that the request to access data protected by a security policy was denied and/or the user is not authorized to access the data.

In step 810, an indication that the user is verified is received from the verification system. For example, in response to verification system 110 verifying the user is authorized to access the data protected by the security policy, access request API 702 of FIG. 7 receives response 722 from verification 110.

In step 812, in response to said receiving the indication in step 810, the computing device is provided access to the data protected by the security policy. For example, in response to receiving response 722 in step 810, DB host 102 of FIG. 7 provides access to computing device 108A to the data protected by the security policy. As shown in FIG. 7, access request API 702 provides a response 724 to application 708A. In accordance with an embodiment, response 724 includes the security policy key included in response 722. In accordance with another embodiment, response 724 includes the (e.g., decrypted) data protected by the security policy. For example, DB host 102 may access the data protected by the security policy and decrypt the protected data for transmission to computing device 108A using the security policy key included in response 722. In accordance with an embodiment, access request API 702 encrypts response 724 with a public user signing key of user key pair 136A. In this context, access request API 702 obtains the public user signing key of user key pair 136A from an identity map (e.g., identity map 114 of FIG. 1) that stores public user signing keys.

Thus, example embodiments of accessing data protected by a security policy have been described with respect to FIGS. 7 and 8. While FIGS. 7 and 8 have been described with respect to computing device 108A providing a request to access data protected by a security policy to DB host 102, it is also contemplated herein that a request may be provided in other ways as well. For example, in accordance with an alternative embodiment, application 708A of FIG. 7 executing on computing device 108A transmits request 712 to verification system 110. In embodiments, verification system 110 may verify request 712 is received from computing device 108A using a public signing key of user key pair 136A and/or validating ledger database 112 based on digest 130A included in request 712 (e.g., using local verification methods described further below). In response to receiving request 712, and optionally verifying request 712 is generated by computing device 108A, verification system 110 transmits a request to access request API 702 for attribute information associated with the requesting user. DB host 102, including access request API 702, validates ledger database 112 and the request in a similar manner described herein with respect to FIGS. 7 and 8 above. In accordance with an embodiment, DB host 102 verifies the request for attribute information is received from verification system 110. If ledger database 112 is validated, request 712 is verified, and the request for attribute information is verified, DB host 102 provides verification request 720 to verification system 110, as described above. In accordance with an embodiment, verification system 110 provides response 722 to application 708A. Alternatively, verification system 110 provides response 722 to DB host 102, as described above.

Figure 9:
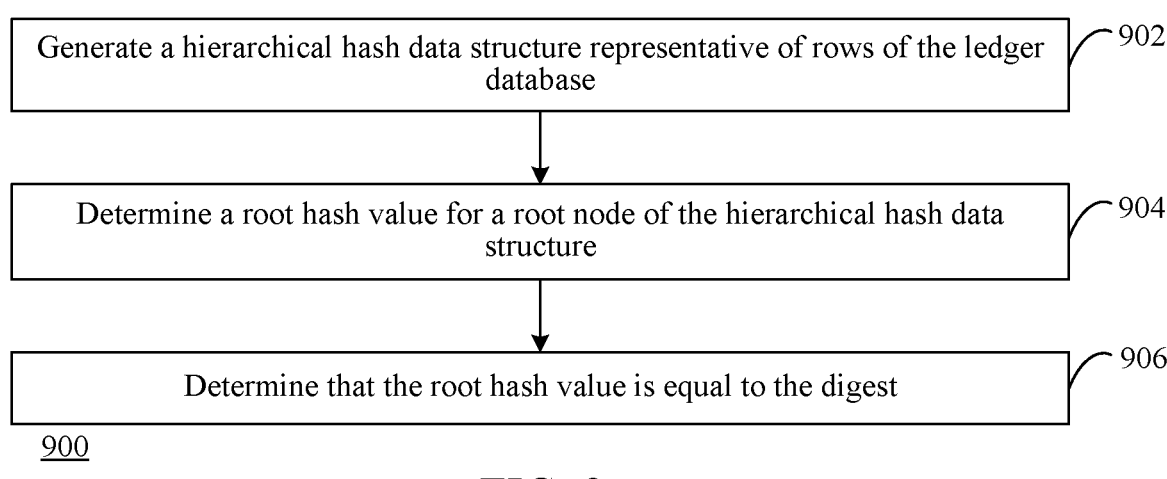
FIG. 9 shows a flowchart for validating a ledger database in accordance with an example embodiment.
Figure 10:
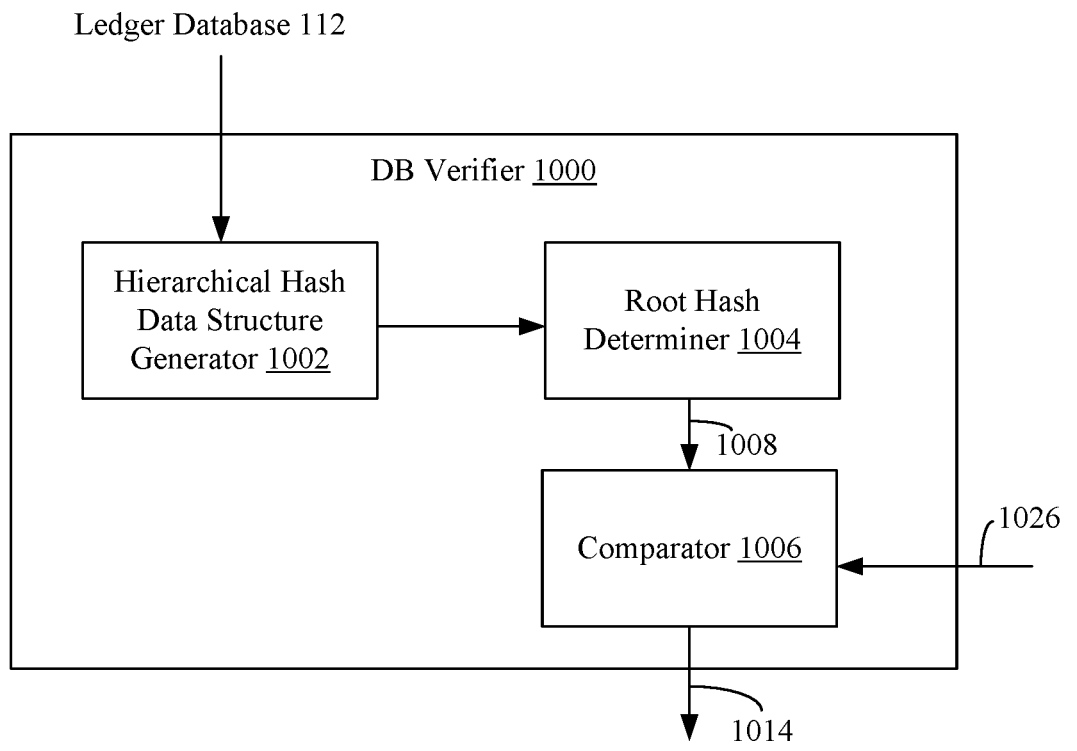
FIG. 10 shows a block diagram of a database verifier in accordance with an example embodiment.
Figure 11:
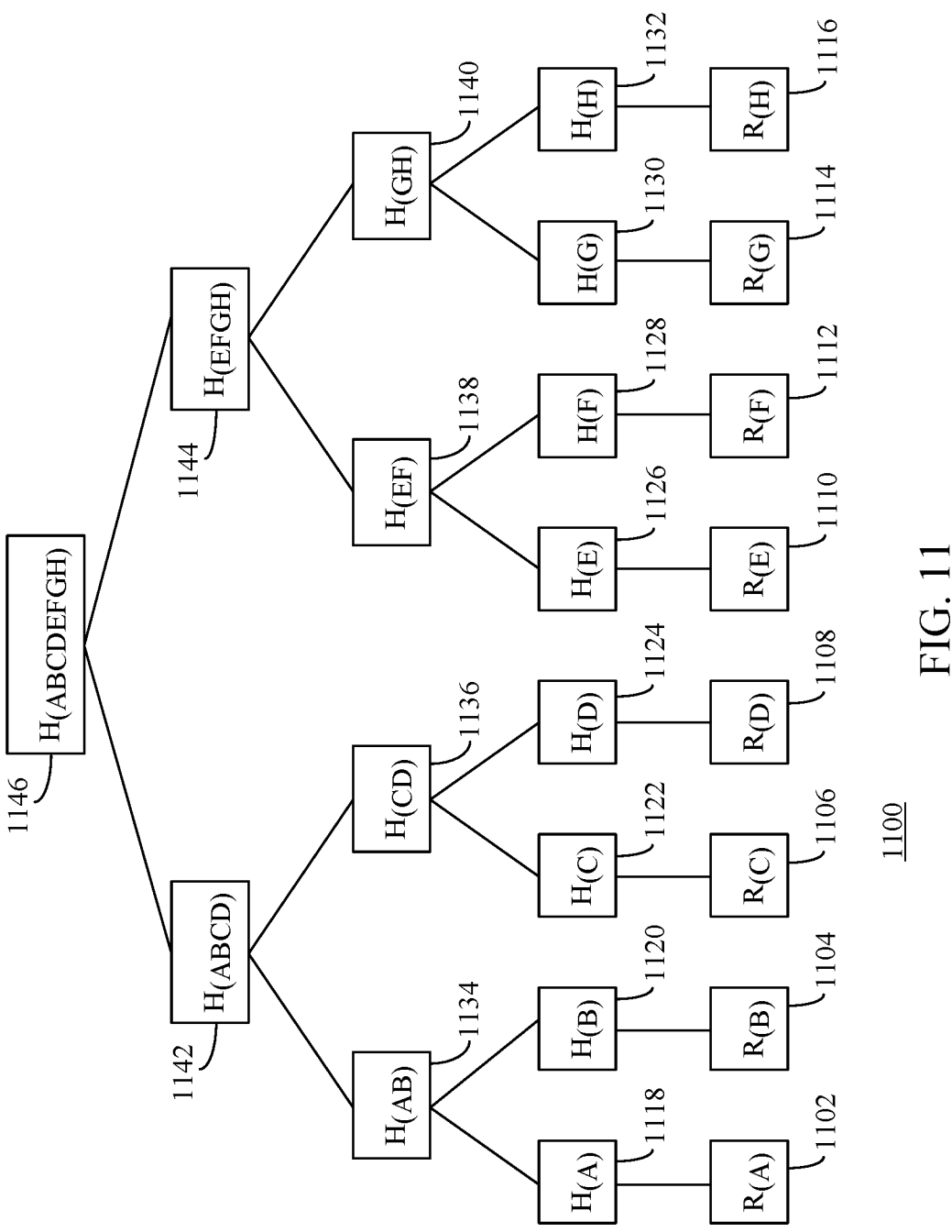
FIG. 11 shows a block diagram of a hierarchical hash data structure in accordance with an example embodiment.

FIG. 9 shows a flowchart 900 for validating a ledger database, according to an example embodiment. For purposes of illustration, flowchart 900 is described below with respect to FIGS. 10 and 11. FIG. 10 depicts a block diagram of a database verifier 1000 in accordance with an example embodiment. Database verifier 1000 ("DB verifier 1000" hereinafter) hereinafter is an example of DB verifier 304, 504, or 704, as respectively described above with reference to FIGS. 3, 5, and 7. As shown in FIG. 10, DB verifier 1000 comprises a hierarchical hash data structure generator 1002, a root hash determiner 1004, and a comparator 1006. FIG. 11 depicts a block diagram of a hierarchical hash data structure 1100 in accordance with an example embodiment. Other structural and operational embodiments will be apparent to persons skilled in the relevant art(s) based on the following discussion regarding flowchart 900, DB verifier 1000 of FIG. 10, and hierarchical hash data structure 1100 of FIG. 11.

Flowchart 900 begins with step 902. In step 902, a hierarchical hash data structure representative of the rows of the ledger database is generated. For example, with reference to FIGS. 10 and 11, hierarchical hash data structure generator 1002 generates a hierarchical hash data structure 1100 representative of the rows of ledger database 112. With further reference to FIG. 11, hierarchical hash data structure generator 1002 initially generates leaf nodes 1118-1132, each of which is corresponding to a respective row of rows 1102-1116 of ledger database 112. Hierarchical hash data structure generator 1002 generates a hash value for each of leaf nodes 1118-1132, which is based on the data stored in a corresponding row. For instance, the data of row 1102 is provided to a hash function (e.g., a SHA-256 based hash function) that generates a hash value H(A), which is stored in leaf node 1118. The data of row 1104 is provided to a hash function that generates a hash value H(B), which is stored in leaf node 1120. The data of row 1106 is provided to a hash function that generates a hash value H(C), which is stored in leaf node 1122. The data of row 1108 is provided to a hash function that generates a hash value H(D), which is stored in leaf node 1124. The data of row 1110 is provided to a hash function that generates a hash value H(E), which is stored in leaf node 1126. The data of row 1112 is provided to a hash function that generates a hash value H(F), which is stored in leaf node 1128. The data of row 1114 is provided to a hash function that generates a hash value H(G), which is stored in leaf node 1130. The data of row 1116 is provided to a hash function that generates a hash value H(H), which is stored in leaf node 1132.

Hierarchical hash data structure generator 1002 then generates parent nodes 1134-1140 based on the hash values of their respective children. For instance, the hash values of nodes 1118 and 1120 are provided to a hash function that generates a hash value H(AB), which is stored in node 1134. The hash values of nodes 1122 and 1124 are provided to a hash function that generates a hash value H(CD), which is stored in node 1136. The hash values of nodes 1126 and 1128 are provided to a hash function that generates a hash value H(EF), which is stored in node 1138. The hash values of nodes 1130 and 1132 are provided to a hash function that generates a hash value H(GH), which is stored in node 1140.

The foregoing process continues until a single root node is generated for all the rows of ledger database 112. For instance, as further shown in FIG. 11, hierarchical hash data structure generator 1002 then generates parent nodes 1134-1140 based on the hash values of their respective children. For instance, the hash values of nodes 1134 and 1136 are provided to a hash function that generates a hash value H(ABCD), which is stored in node 1142. The hash values of nodes 1138 and 1140 are provided to a hash function that generates a hash value H(EFGH), which is stored in node 1140. Hierarchical hash data structure generator 1002 then generates a parent node 1146 based on the hash values of its respective children. For instance, the hash values of nodes 1142 and 1144 are provided to a hash function that generates a hash value H(ABCDEFGH), which is stored in node 1146. Node 1146 is the root node of hierarchical hash data structure generator 1002.

In accordance with one or more embodiments, the hierarchical hash data structure is a Merkle tree. For example, with reference to FIG. 11, hierarchical hash data structure 1100 is a Merkle tree.

In step 904, a root hash value for the root node of the hierarchical hash data structure is determined. For example, with reference to FIGS. 10 and 11, root hash determiner 1004 determines the root hash value (e.g., H(ABCDEFGH)) of root node 1146. Root hash determiner 1104 provides the root hash value (shown as root hash value 1008) to comparator 1106.

In step 906, a determination is made that the root hash value is equal to the digest. For example, with reference to FIG. 10, comparator 1006 compares root hash value 1008 to a digest 1026 to determine whether they are equal to each other. In response to determining that they are equal to each other, comparator 1006 determines that ledger database 112 has not been tampered with and provides a notification 1014 indicating as much. Notification 1014 is an example of notifications 314, 514, and 714, as respectively described above with reference to FIGS. 3, 5, and 7. Digest 1026 is an example of digests 126, 128, 130A-130N, and 526, as respectively described above with reference to FIGS. 1, 3, 5, and 7.

II. Additional Embodiments

A. Referencing Multiple Identity Maps

Figure 12:
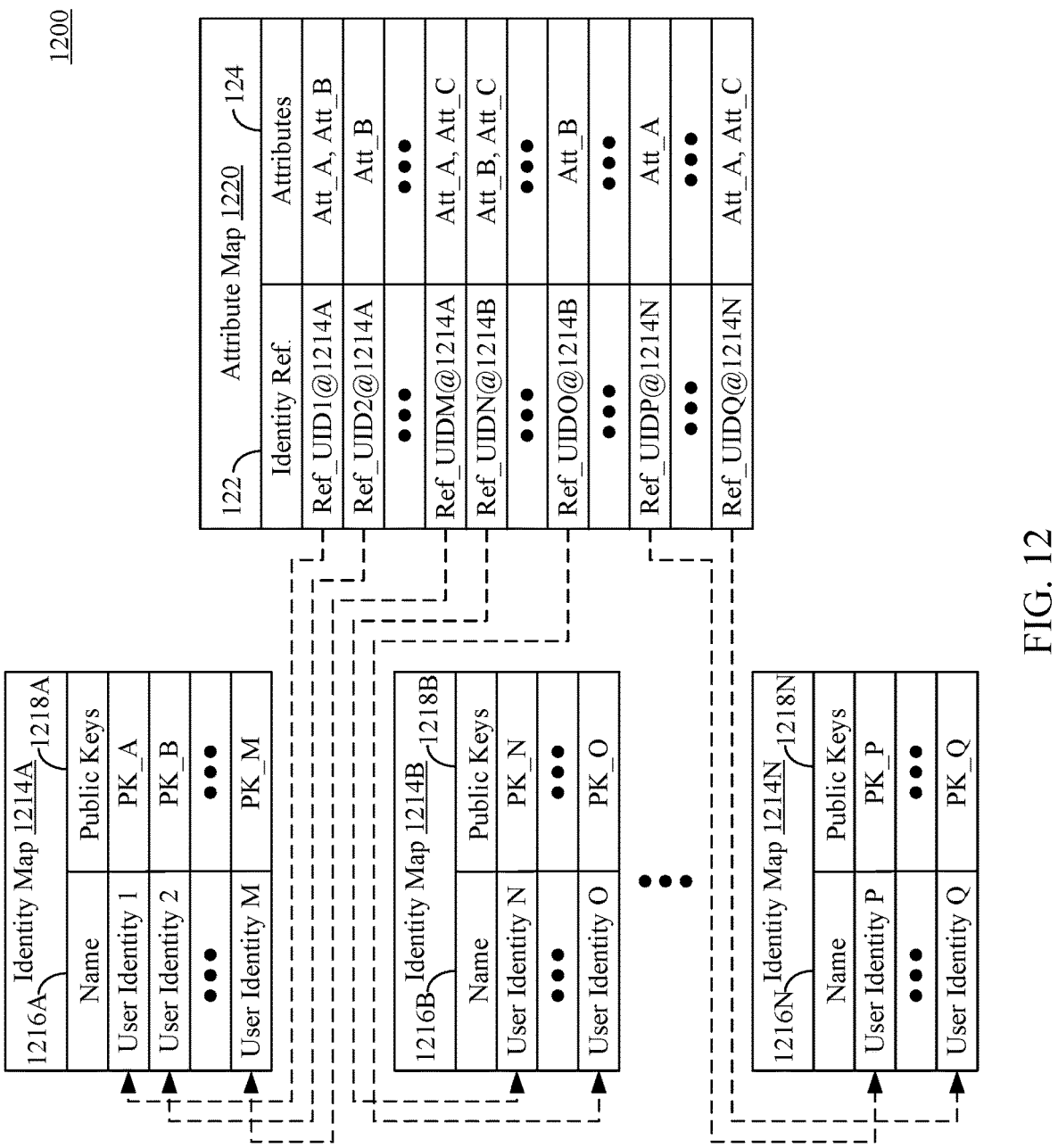
FIG. 12 shows a block diagram of an attribute map referencing multiple identity maps in accordance with an example embodiment.

As described herein, an attribute map includes references to identities of users. In accordance with an embodiment, each reference to an identity of a user corresponds to an identity of a user stored in an identity map. For example, as shown in and described with respect to FIG. 1 above, Reference 1, Reference 2, and Reference N stored in column 122 of attribute map 120 correspond to User Identity 1, User Identity 2, and User Identity N stored in column 116 of identity map 114. It is also contemplated herein that references stored in an attribute map may reference identities of users stored in more than one identity map. For instance, FIG. 12 shows a block diagram 1200 ("diagram 1200" hereinafter) of an attribute map referencing multiple identity maps in accordance with an example embodiment. As shown in FIG. 12, diagram 1200 includes a plurality of identity maps 1214A-1214N and attribute map 1220. Each of identity maps 1214A-1214N and attribute map 1220 are stored in and protected by respective ledger databases, as described elsewhere herein. Alternatively, a ledger database that stores and protects attribute map 1220 also stores and protects one or more of identity maps 1214A-1214N.

Each of identity maps 1214A-1214N store identities of respective users (e.g., members, employees, etc.), for example, of an entity. For instance, identity map 1214A stores identities User Identity 1 to User Identity M in a column 1216A, identity map 1214B stores identities User Identity N to User Identity 0 in a column 1216B, and identity map 1214N stores identities User Identity P to User Identity Q in a column 1216N. Each identity comprises information that uniquely identifies the respective user within the respective entity. Examples of the identity include, but are not limited to, the user's email address, the user's phone number, the user's username, or any other type of information that uniquely identifies the user. Each of identity maps 1214A-1214N also stores, for each respective user, a public signing key of the user in association with the identity of the user in a column 1218.

Each of identity maps 1214A-1214N may be managed by separate entities, departments within the same entity, or a combination thereof. For example, in accordance with one embodiment, identity map 1214A is managed by Entity A, identity map 1214B is managed by Entity B, and identity map 1214N is managed by Entity N. In accordance with another embodiment, identity map 1214A is managed by Department A of Entity A, identity map 1214B is managed by Department B of Entity A, and identity map 1214N is managed by Department N of Entity A. Each entity or department maintains and/or publishes their own identity map comprising identities and public key(s) for members of the entity, as described elsewhere herein.

Any of identity maps 1214A-1214N may store identities and signing keys of publishing authorities and/or attribute authorities of an entity. For example, in accordance with an embodiment identity map 1214A is managed by Entity A, identity map 1214B is managed by Department B of Entity A (e.g., a deparlinent, sub-entity, or other subset of Entity A), and identity map 1214N is managed by Department N of Entity A. In this context, identity map 1214N stores the identities and associated public signing keys of departments (e.g., Department A and Department B), publishing authorities (e.g., a publishing authority (or attribute authority with publishing privileges) separate from Departments A and B, or a department with publishing privileges), and/or attribute authorities of Entity A (e.g., an attribute authority separate from Departments A and B, or a department with attribute privileges), identity map 1214B stores the identities and associated public signing keys of members of Department B, and identity map 1214N stores the identities and associated public signing keys of members of Department N.

Attribute map 1220 stores references to identities of respective users and attributes associated with the references. Examples of a reference to an identity include, but are not limited to, a copy of an identity stored in an identity map (e.g., any of identity maps 1214A-1214N), a link to an identity stored in an identity map (e.g., any of identity maps 1214A-1214N), a location within an identity map (e.g., an entry, a row, and/or a column within any of identity maps 1214A-1214N), or any other type of data that uniquely references an identity of a user. In accordance with an embodiment, a reference to an identity includes information that indicates the referenced identity and the identity map the referenced identity is stored in. For example, as shown in FIG. 12, Ref UID1@1214A, Ref UID2@1214A, and Ref UIDM@1214A respectively indicate User Identity 1, User Identity 2, and User Identity M stored in identity map 1214A and indicate identity map 1214A, Ref UIDN@1214B and Ref UIDO@1214B respectively indicate User Identity N and User Identity 0 stored in identity map 1214B and indicate identity map 1214B, and Ref UIDP@1214N and Ref UIDQ@1214N respectively indicate User Identity P and User Identity Q stored in identity map 1214N and indicate identity map 1214N.

Attribute map 1220 also stores, for each user, one or more attributes associated with a user in association with the reference to the identity, as described elsewhere herein. In accordance with an embodiment, attribute map 1220 also stores, for each user, one or more secrets associated with attributes associated with the respective user, as described elsewhere herein.

An entity that acts as an attribute authority (or a publishing authority on behalf of or jointly with one or more attribute authorities) maintains and/or publishes attribute map 1220. Using attribute map 1220, an attribute authority of an entity can grant attributes to a member of the entity or another entity. For example, an attribute authority of the entity that maintains attribute map 1220 grants attributes to members of the entity that manages identity map 1214A, the entity that manages identity map 1214B, and the entity that manages identity map 1214N. In accordance with an embodiment, the entity that maintains attribute map 1220 also maintains one or more of identity maps 1214A-1214N. As will be discussed further below with respect to FIG. 13, attribute map 1220 may be maintained and/or published by more than one attribute authority or publishing authority.

As described above, one of identity maps 1214A-1214N in accordance with an embodiment includes identities and associated public keys of departments, publishing authorities, and/or attribute authorities. In this manner, attribute information stored in attribute map 1220 may be associated with a reference to an identity of a department, a publishing authority, and/or an attribute authority stored in the one of identity maps 1214A-1214N in a manner similar to associating attribute information to a reference to an identity of a user, as described herein. This enables an entity (or an attribute authority within an entity) to associate attributes with a department, sub-entity, attribute authority, and/or publishing authority. In accordance with an embodiment, associating an attribute with an entity, department, sub-organization, attribute authority, and/or publishing authority grants attribute authority and/or publishing authority thereto.

B. Multiple Attribute and Publishing Authorities

Figure 13:
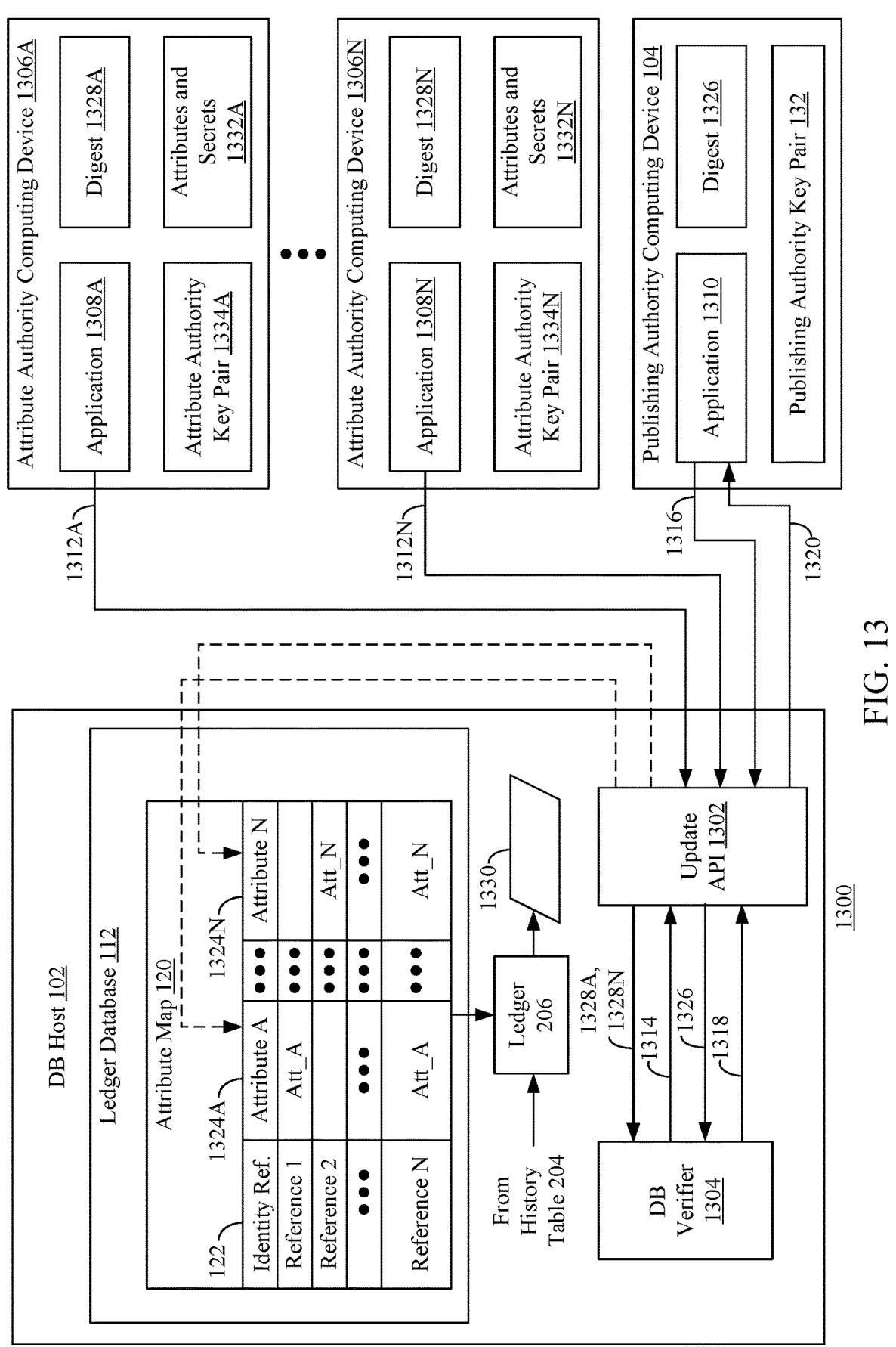
FIG. 13 shows a block diagram of a system that updates and publishes an attribute map in accordance with an example embodiment.

FIGS. 3-8 have been described above with respect to a single attribute authority that manages and maintains an attribute map of a ledger database. However, it is also contemplated herein that an attribute map may be managed and maintained by multiple attribute authorities. Furthermore, a publishing authority may publish the attribute map on behalf of one or more attribute authorities. In this context, multiple computing devices corresponding to respective attribute authorities and/or publishing authorities interact with a ledger database to manage and maintain an attribute map accessible to computing devices. For instance, FIG. 13 shows a block diagram of a system 1300 that updates and publishes an attribute map in accordance with an example embodiment. As shown in FIG. 13, system 1300 comprises DB host 102 and publishing authority computing device 104, as described above with reference to FIG. 1, and a plurality of attribute authority computing devices 1306A-1306N. DB host 102 executes ledger database 112 comprising attribute map 120 and comprises ledger 206, an update API 1302, and a DB verifier 1304. Each of attribute authority computing devices 1306A-1306N are examples of attribute authority computing device 106, as described above with reference to FIG. 1. As shown in FIG. 13, each of attribute authority computing devices 1306A-1306N comprise a respective application 1308A-1308N, a respective digest 1328A-1328N, a respective attribute authority key pair 1334A-1334N, and a respective attributes and secrets 1332A-1332N. As also shown in FIG. 13, publishing authority computing device 104 comprises an application 1310, a digest 1326, and a publishing authority key pair 132. Digests 1326 and 1328A-1328N are examples of digest 126 and 128, respectively, as described above with reference to FIG. 1.

Applications 1308A-1308N are any software applications in which an entity (or a user on behalf of the entity) associated with attribute authority computing devices 1306A-1306N utilizes the application to manage attributes associated with users corresponding to references to identities stored in column 122 of attribute map 120. Application 1310 is any software application in which an entity (or a user on behalf of the entity) associated with publishing authority computing device 104 utilizes the application to publish attribute map 120 so that it is accessible to computing devices (e.g., computing devices 108A-108N of FIG. 1, publishing authority computing device 104, attribute authority computing devices 1306A-1306N, and/or any other computing device that would require access to attribute map 120). In accordance with an embodiment, application 1310 includes functions that enable the user of publishing authority computing device 104 to manage attributes associated with users corresponding to references to identities stored in column 122 of attribute map 120.

As shown in FIG. 13, attribute map 120 includes column 122 that stores references to identities of users, as described above with reference to FIG. 1. As also shown in FIG. 13, attribute map 120 includes a plurality of attribute columns 1324A-1324N. Each of attribute columns 1324A-1324N store an indication of whether or not a corresponding attribute is associated to a reference to an identity of a user. In accordance with an embodiment, such indication is the attribute. In accordance with another embodiment, the indication is a marker (e.g., a "Yes" indication, a "No" indication, a "TRUE" indication, a "FALSE" indication, etc.) that indicates whether or not the attribute corresponding to the attribute column is associated with the reference to an identity of a user. In accordance with another embodiment, an attribute column includes multiple indications corresponding to different attributes associated with the reference to an identity of a user.

In the example embodiment of FIG. 13, each of attribute authority computing devices 1306A-1306N manages a corresponding one of attribute columns 1324A-1324N. In this context, attribute authorities of attribute authority computing devices 1306A-1306N are able to associate attributes and/or secrets managed by the attribute authority with references to identities of users stored in column 122 of attribute map 120. In accordance with an embodiment, each of attribute authority computing device 1306A signs the respective attribute column 1324A-1324N. In this manner, attribute authorities jointly maintain and manage attributes associated with references to identities of users in attribute map 120. Example of attribute authorities that jointly manage the same attribute map include, but are not limited to, departments or subsets of an entity, subsidiaries of a parent entity, collaborating entities, entities that are members of an association (e.g., a trade association), and/or any other types of attribute authorities described elsewhere herein, and/or any combination of different types of attribute authorities described herein.

System 1300 may modify information of attribute map 120 to include new information in and/or remove information from attribute map 120 in various ways, in embodiments. Furthermore, system 1300 may publish attribute map 120 in various ways, in embodiments. For instance, the example shown in FIG. 13 illustrates system 1300 updating attribute map 120 to include new information in a similar manner described above with reference to FIGS. 3 and 4. In FIG. 13, update API 1302 receives a request 1312A from application 1308A to update attribute column 1324A of attribute map 120 maintained by ledger database 112. Request 1312A includes first updated attribute information generated by, for example, application 1308A and signed with the private key of attribute authority key pair 1334A (e.g., by application 1308A). The first updated attribute information includes attributes and/or secrets to be associated with a reference to an identity of a user stored in attribute map 120. Identities of users or indications of locations of references to identities of users within attribute map 120 may be included with the first updated attribute information or request 1312A, as described elsewhere herein.

In accordance with an embodiment, request 1312A includes digest 1328A, which is representative of a state of ledger database 112 (including attribute map 120), and the first signed updated attribute information. In accordance with another embodiment, digest 1328A and the first signed updated attribute information are included in separate requests received from attribute authority computing device 1306A. It is noted in embodiments update API 1302 receives a plurality of digests via request(s), where the plurality of digests comprises some or all of the digests previously generated by ledger 206.

DB verifier 1304 validates ledger database 112 based at least on digest 1328A received from attribute authority computing device 1306A. DB verifier 1304 is an example of DB verifier 304, as described above with reference to FIG. 3. As shown in FIG. 13, update API 1302 provides digest 1328A to DB verifier 1304. DB verifier 1304 validates ledger database 112 based on digest 1328A in a manner similar to DB verifier 304, as described above with reference to FIGS. 3 and 4. If DB verifier 1304 determines that ledger database 112 has not been tampered with, DB verifier 1304 provides a notification 1314 to update API 1302 indicating that the ledger database 112 has not been tampered with.

If DB verifier 1304 determines that ledger database 112 has been tampered with, DB verifier 1304 issues a notification to update API 1302. In accordance with an embodiment, responsive to receiving the notification, update API 1302 returns an error message to application 1308A indicating that ledger database 112 has been tampered with and/or the attribute information was not successfully stored in attribute map 120.

In accordance with an embodiment where some or all previously-generated digests are provided to update API 1302, DB verifier 1302 verifies all such digests. This way, if an attacker manages to compromise ledger database 112 prior to the latest digest being generated and provides attribute authority computing device 1306A with that digest, DB verifier 1304 will still be able to verify that the ledger database 112 was compromised.

In response to receiving notification 1314 from DB verifier 1304, update API 1302 provides the first signed updated attribute information to ledger database 112. Ledger database 112 uses a public signing key of the attribute authority of attribute authority computing device 1306A to verify that the first signed updated attribute information was signed using the attribute authority's private signing key. If ledger database 112 determines that the first updated attribute information was signed using the attribute authority's private signing key, ledger database 112 updates attribute map 120 to associate the attribute information (e.g., attributes and/or secrets) included in the first signed updated attribute information with corresponding references to identities of users. For instance, DB host 102 stores Att_A in attribute column 1324A in the rows corresponding to Reference 1 and Reference N of column 122 based on the first signed updated attribute information included in request 1312A. In accordance with an embodiment, after attribute map 120 is updated, the attribute authority user of attribute authority user computing device 1306A signs attribute column 1324A using the private key of attribute authority key pair 1334A (e.g., by application 1308A).

If ledger database 112 determines that the first updated attribute information was not signed using the attribute authority's private signing key, ledger database 112 does not update attribute map 120 with the first updated attribute information. In accordance with an embodiment, update API 1302 returns an error message to application 1308A indicating that the first updated attribute information was not successfully stored in attribute map 120.

System 1300 updates attribute map 120 with respect to requests received from attribute authority computing device 1306N in a similar fashion. For example, as also shown in FIG. 13, update API 1302 receives a request 1312N from application 1308N to update attribute column 1324N of attribute map 120 maintained by ledger database 112. Request 1312N includes second updated attribute information generated by, for example, application 1308N and signed with the private key of attribute authority key pair 1334N (e.g., by application 1308N). The second updated attribute information includes attributes and/or secrets to be associated with a reference to an identity of a user stored in attribute map 120. Identities of users or indications of locations of references to identities of users within attribute map 120 may be included with the second updated attribute information or request 1312N, as described elsewhere herein.

In accordance with an embodiment, request 1312N includes digest 1328N, which is representative of a state of ledger database 112 (including attribute map 120), and the second signed updated attribute information. In accordance with another embodiment, digest 1328N and the second signed updated attribute information are included in separate requests received from attribute authority computing device 1306N. It is noted in embodiments update API 1302 receives a plurality of digests via request(s), where the plurality of digests comprises some or all of the digests previously generated by ledger 206.

DB verifier 1304 validates ledger database 112 based at least on digest 1328N received from attribute authority computing device 1306N. As stated above, DB verifier 1304 is an example of DB verifier 304, as described above with reference to FIG. 3. As shown in FIG. 13, update API 1302 provides digest 1328N to DB verifier 1304. DB verifier 1304 validates ledger database 112 based on digest 1328N in a manner similar to DB verifier 304, as described above with reference to FIGS. 3 and 4. If DB verifier 1304 determines that ledger database 112 has not been tampered with, DB verifier 1304 provides notification 1314 to update API 1302 indicating that the ledger database 112 has not been tampered with.

If DB verifier 1304 determines that ledger database 112 has been tampered with, DB verifier 1304 issues a notification to update API 1302. In accordance with an embodiment, responsive to receiving the notification, update API 1302 returns an error message to application 1308N indicating that ledger database 112 has been tampered with and/or the attribute information was not successfully stored in attribute map 120.

In accordance with an embodiment where some or all previously-generated digests are provided to update API 1302, DB verifier 1302 verifies all such digests. This way, if an attacker manages to compromise ledger database 112 prior to the latest digest being generated and provides attribute authority computing device 1306N with that digest, DB verifier 1304 will still be able to verify that the ledger database 112 was compromised.

In response to receiving notification 1314 from DB verifier 1304, update API 1302 provides the second signed updated attribute information to ledger database 112. Ledger database 112 uses a public signing key of the attribute authority of attribute authority computing device 1306N to verify that the second signed updated attribute information was signed using the attribute authority's private signing key. If ledger database 112 determines that the second updated attribute information was signed using the attribute authority's private signing key, ledger database 112 updates attribute map 120 to associate the attribute information (e.g., attributes and/or secrets) included in the second signed updated attribute information with corresponding references to identities of users. For instance, DB host 102 stores Att N in attribute column 1324N in the rows corresponding to Reference 2 and Reference N of column 122 based on the second signed updated attribute information included in request 1312N. In accordance with an embodiment, after attribute map 120 is updated, the attribute authority user of attribute authority user computing device 1306N signs attribute column 1324N using the private key of attribute authority key pair 1334N (e.g., by application 1308N).

If ledger database 112 determines that the second updated attribute information was not signed using the attribute authority's private signing key, ledger database 112 does not update attribute map 120 with the second updated attribute information. In accordance with an embodiment, update API 1302 returns an error message to application 1308N indicating that the second updated attribute information was not successfully stored in attribute map 120.

After some time (e.g., after attribute map 120 is updated with the first and second updated attribute information, as described above), ledger 206 of DB host 102 generates an updated digest 1330 representative of the state of ledger database 112 after associating the first and second updated attribute information with corresponding references to identities of users. Updated digest 1330 is generated in a similar manner as described above with reference to FIG. 2 based on attribute map 120 (which is stored in updateable ledger table 202, as shown in FIG. 2) and history table 204 (as also shown in FIG. 2).

Access to updated digest 1330 is provided to users in various ways. For example, in accordance with an embodiment, the entity that maintains attribute map 120 publishes updated digest 1330, for example, via a web page that is accessible to computing devices of users (e.g., computing devices 108A-108N of FIG. 1, publishing authority computing device 104, attribute authority computing devices 1306A-1306N, and/or any other computing device that would require access to attribute map 120). In accordance with another example, computing devices obtain updated digest 1330 from DB host 102. For example, DB host 102 provides a request comprising updated digest 1330 to computing devices, and the computing devices store updated digest 1330, for example, in a memory thereof. In another example, a computing device provides a request to DB host 102 for updated digest 1330, and DB host 102 provides a response that includes updated digest 1330 thereto. It is noted that in embodiments DB host 102 provides access to some or all digests that are generated by ledger database 112 over time.

In accordance with an embodiment, updated digest 1330, when published or otherwise provided to a user, is signed by a private key of publishing authority key pair 132. For example, in response to generating updated digest 1330, DB host 102 provides a notification to publishing authority computing device 104 indicating that attribute map 120 has been updated and a new digest has been generated. In response to receiving the notification, application 1310 transmits a request 1316 to update API 1302. In accordance with an embodiment, request 1316 includes digest 1326. It is noted in embodiments that a plurality of digests is provided to update API 1302 via request(s), where the plurality of digests comprises some or all of the digests previously generated by ledger 206.

DB verifier 1304 validates ledger database 112 based on digest 1326 received from publishing authority computing device 104 in a similar manner described with respect to DB verifier 304 of FIG. 3. In accordance with an embodiment, DB verifier 1304 validates ledger database 112 based digest 1326 and the state of ledger database 112 prior to the association of first and second updated attribute information. If DB verifier 1304 determines that ledger database 112 has not been tampered with, DB verifier provides a notification 1318 to update API 1302 indicating that ledger database 112 has not been tampered with.

Responsive to receiving notification 1318, update API 1302 queries ledger database 112 for some or all of attribute map 120. For instance, in accordance with an embodiment, update API 1302 queries ledger database 112 for the entirety of attribute map 120. In accordance with another embodiment, update API 1302 submits a query to ledger database 112 for data stored in one or more columns of attribute map 120. For instance, if DB host 102 provided a notification to publishing authority computing device 104 indicating that attribute column 1324A and 1324N of attribute map 1320 were updated, application 1310 in accordance with an embodiment generates request 1316 in a manner that requests (e.g., only) information from attribute column 1324A and 1324N. In any case, ledger database 112 returns the queried information (e.g., attribute map 120 or one or more columns of attribute map 120) to update API 1302 via a response. Update API 1302 provides the queried information to application 1310 via a response 1320. In accordance with an embodiment, response 1320 includes updated digest 1330.

In response to receiving response 1320, application 1310, using public signing keys of attribute authorities, verifies that the attribute columns included in response 1320 (e.g., included as separate columns, a group of columns, or within a copy of attribute map 120) were signed using the respective attribute authority's private signing key. For instance, application 1310 uses the public signing key of attribute authority key pair 1334A to verify attribute column 1324A was signed by the private signing key of attribute authority key pair 1334A, and uses the public signing key of attribute authority key pair 1334N to verify attribute column 1324N was signed by the private signing key of attribute authority key pair 1334N. If application 1310 determines that the attribute columns were signed using the respective attribute authority's private signing key, application 1310 signs updated digest 1330 with the private signing key of publishing authority key pair 1336. After application 1310 signs updated digest 1330, updated digest 1330 is made accessible to users, as described elsewhere herein.

While system 1300 has been described above with respect to a publishing authority signing a digest prior to providing access to the digest, it is also contemplated herein that a publishing authority may sign an attribute map prior to generating the digest. For instance, in accordance with an embodiment, DB host 102 alerts publishing authority computing device 104 that attribute map 120 has been updated prior to generating updated digest 1330. In this context, publishing authority computing device 104 verifies that the updated attribute columns of attribute map 120 have been signed by a respective attribute authority's private signing key, and, if so, signs (e.g., by application 1310) attribute map 120. In this example, ledger database 112 generates updated digest 1330 subsequent to a publishing authority signing attribute map 120 with their private signing key (e.g., by application 1310). In accordance with an embodiment, ledger database 112 uses a public signing key of the publishing authority to verify that the signed attribute map was signed using the publishing authority's private signing key. If ledger database 112 determines that the attribute table was signed using the publishing authority's private signing key, ledger database 112 generates updated ledger 1330, as described elsewhere herein. Otherwise, ledger database 112 does not generate updated ledger 1330. In accordance with an embodiment, update API 1302 returns an error message to application 1310 indicating that the updated ledger was not successfully generated and/or that the attribute map was not properly signed.

Furthermore, while system 1300 has been described with respect to application 1310 verifying attribute columns of attribute map 120 have been signed by private signing keys of respective attribute authorities, it is also contemplated herein that ledger database 112, using respective public signing keys of respective attribute authorities, verifies attribute columns of attribute map 120 have been signed by private signing keys of respective attribute authorities. In accordance with an embodiment, ledger database 112 periodically verifies attribute columns of attribute map 120 have been signed by private signing keys of respective attribute authorities. In accordance with another embodiment, ledger database 112 performs such verification subsequent to the attribute column being updated. In accordance with another embodiment, ledger database 112 performs such verification prior to DB host 102 notifying publishing authority computing device 104 that attribute map 120 has been updated.

Further still, attribute map 120 has been described as including a column 122 that stores references to identities of users and attribute columns 1324A-1324N that store attributes associated with the references. It is also contemplated herein that attribute map 120 may include one or more columns that store secrets associated with the references, as described elsewhere herein. In accordance with an embodiment, each secret is stored in a respective secret column. In accordance with an embodiment, secrets managed by the same attribute authority are stored in the same secret column. In accordance with an embodiment, secrets managed by multiple (e.g., all) attribute authorities are stored in the same secret column.

Moreover, while system 1300 has been described with respect to updating an attribute map and publishing a digest, it is also contemplated herein that system 1300 may modify an attribute map in other ways (e.g., to remove a reference to an identity of a user, an attribute associated therewith, and/or a secret associated therewith) and publish a digest. For instance, system 1300 may include a revoke API that operates similar to revoke API 506 as described in reference to FIG. 5.

C. Local Verification

In the embodiments described above, a database verifier (e.g., DB verifiers 304, 504, 704, 1004, and 1304) executing on DB host 102 verifies whether ledger database 112 has been tampered with. In accordance with one or more other embodiments, the verification is performed locally on a computing device (e.g., publishing authority computing device 104, attribute authority computing device 106, computing devices 108A-108N, verification system 110, attribute authority computing devices 1306A-1306N, and/or any other computing device that accesses a digest and performs local verification of ledger database 112). The foregoing is achievable using proofs of the hierarchical hash data structure (e.g., Merkle proofs), which are maintained by the database host (e.g., DB host 102).

For instance, as described above, a computing device obtains a digest (e.g., digest 126, digest 128, digests 130A-130N, digest 526, digest 1326, and/or digests 1328A-1328N) from ledger database 112 and stores the digest locally. When performing a lookup operation, the computing device provides a request to a lookup API for attribute information associated with a particular user. In response, ledger database 112 provides a response comprising the attribute information, along with a proof of membership. The proof of membership comprises all the hashes associated with the attribute information that are needed to be combined to obtain the root hash value of ledger database 112. For example, with reference to FIG. 11, suppose the requested attribute information is included in R(C). In this example, the hash values stored in nodes 1124, 1134, and 1144 would be provided as the proof of membership, as these hash values are required to reconstruct the root hash value.

The computing device generates a hash value of the requested attribute information and provides the hash value and the received hash value of node 1124 to a hash function, which generates a hash value H(CD). The computing device then provides hash value H(CD) and the received hash value of node 1134 to a hash function, which generates a hash value H(ABCD). The computing device then provides hash value H(ABCD) and the received hash value of node 1144 to a hash function, which generates a hash value H(ABCDEFGH). Using this technique, the computing device has generated a version of the root hash value. The computing device then compares the generated root hash value to the digest maintained thereby to determine whether they are equal. If they are equal, then the computing device determines that ledger database 112 has not been tampered with.

In accordance with an embodiment, the computing device then verifies the validity of the attribute information by determining whether the attribute information was signed by the associated attribute authority's long-term private encryption key, as described above.

Responsive to determining that ledger database 112 has not been tampered with (and optionally validating the attribute information), the computing device determines that the attribute information is valid and uses it accordingly. For instance, verification system 110 in accordance with an embodiment verifies that attribute information provided thereto is valid (e.g., for verifying whether or not a user is authorized to access data protected by a security policy, as described above with reference to FIGS. 5 and 6).

The foregoing technique advantageously enables the computing device to verify the attribute information without having to download the entire dataset of ledger database 112, thereby conserving compute resources (e.g., processing cycles, memory, storage, input/output (I/O) transactions, power, etc.).

It is noted that in accordance with one or more embodiments, the computing device stores locally (or caches) attribute information. In this case, the computing device also compares the attribute information to the locally-cached version of the attribute information to determine whether they are consistent as an additional verification check.

III. Further Example Embodiments and Advantages

As noted above, systems, devices, and methods described herein relate to verifiable attribute maps. For instance, embodiments described herein may update, remove, modify, and/or otherwise manage an attribute map that stores references to identities of users and associated attribute information. Embodiments may also retrieve information from an attribute map and/or request access to data protected by a security policy. Such embodiments improve data encryption, security, and privacy methods.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Moreover, according to the described embodiments and techniques, any components of systems, DB hosts, publishing authority computing devices, attribute computing devices, verification systems, ledger databases, and/or database verifiers and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

IV. Example Mobile Device and Computer System Implementation

Each of system 100, ledger database 200, system 300, system 500, system 700, database verifier 1000, system 1300, and/or each of the steps of flowcharts 400, 420, 600, 800, and/or 900 may be implemented in hardware, or hardware combined with software and/or firmware. For example, system 100, ledger database 200, system 300, system 500, system 700, database verifier 1000, and/or system 1300 (and/or any of the components thereof) and/or the steps of flowcharts 400, 420, 600, 800, and/or 900 may be implemented as computer program code (e.g., instructions in a programming language) configured to be executed in one or more processors and stored in a computer readable storage medium. Alternatively, system 100, ledger database 200, system 300, system 500, system 700, database verifier 1000, and/or system 1300 (and/or any of the components thereof) and/or the steps of flowcharts 400, 420, 600, 800, and/or 900 may be implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
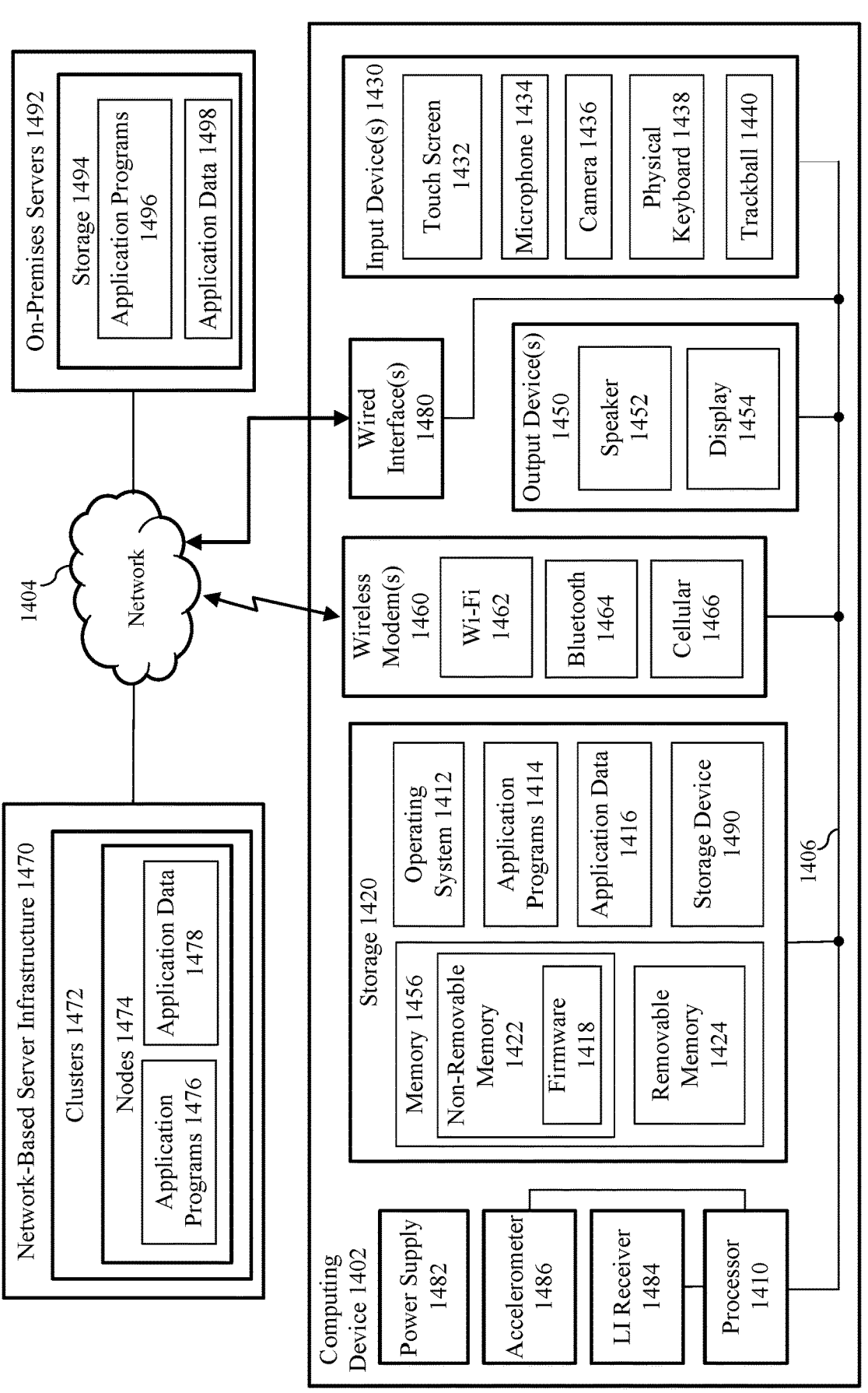
FIG. 14 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 14. FIG. 14 shows a block diagram of an exemplary computing environment 1400 that includes a computing device 1402. In some embodiments, computing device 1402 is communicatively coupled with devices (not shown in FIG. 14) external to computing environment 1400 via network 1404. Network 1404 comprises one or more networks such as local area networks (LANs), wide area networks (WANs), enterprise networks, the Internet, etc., and may include one or more wired and/or wireless portions. Network 1404 may additional or alternatively include a cellular network for cellular communications. Computing device 1402 is described in detail as follows Computing device 1402 can be any of a variety of types of computing devices. For example, computing device 1402 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1402 may alternatively be a stationary computing device such as a desktop computer, a personal computer (PC), a stationary server device, a minicomputer, a mainframe, a supercomputer, etc.

As shown in FIG. 14, computing device 1402 includes a variety of hardware and software components, including a processor 1410, a storage 1420, one or more input devices 1430, one or more output devices 1450, one or more wireless modems 1460, one or more wired interface(s) 1480, a power supply 1482, a location information (LI) receiver 1484, and an accelerometer 1486. Storage 1420 includes memory 1456, which includes non-removable memory 1422 and removable memory 1424, and a storage device 1490. Storage 1420 also stores an operating system 1412, application programs 1414, and application data 1416. Wireless modem(s) 1460 include a Wi-Fi modem 1462, a Bluetooth modem 1464, and a cellular modem 1466. Output device(s) 1450 includes a speaker 1452 and a display 1454. Input device(s) 1430 includes a touch screen 1432, a microphone 1434, a camera 1436, a physical keyboard 1438, and a trackball 1440. Not all components of computing device 1402 shown in FIG. 14 are present in all embodiments, additional components not shown may be present, and any combination of the components may be present in a particular embodiment. These components of computing device 1402 are described as follows.

A single processor 1410 (e.g., central processing unit (CPU), microcontroller, a microprocessor, signal processor, ASIC (application specific integrated circuit), and/or other physical hardware processor circuit) or multiple processors 1410 may be present in computing device 1402 for performing such tasks as program execution, signal coding, data processing, input/output processing, power control, and/or other functions. Processor 1410 may be a single-core or multi-core processor, and each processor core may be single-threaded or multithreaded (to provide multiple threads of execution concurrently). Processor 1410 is configured to execute program code stored in a computer readable medium, such as program code of operating system 1412 and application programs 1414 stored in storage 1420. Operating system 1412 controls the allocation and usage of the components of computing device 1402 and provides support for one or more application programs 1414 (also referred to as "applications" or "apps"). Application programs 1414 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1402 can communicate with any other component according to function, although not all connections are shown for ease of illustration. For instance, as shown in FIG. 14, bus 1406 is a multiple signal line communication medium (e.g., conductive traces in silicon, metal traces along a motherboard, wires, etc.) that may be present to communicatively couple processor 1410 to various other components of computing device 1402, although in other embodiments, an alternative bus, further busses, and/or one or more individual signal lines may be present to communicatively couple components. Bus 1406 represents one or more of any of several types of bus structures, including a memory bus or memory controller, a peripheral bus, an accelerated graphics port, and a processor or local bus using any of a variety of bus architectures.

Storage 1420 is physical storage that includes one or both of memory 1456 and storage device 1490, which store operating system 1412, application programs 1414, and application data 1416 according to any distribution. Non-removable memory 1422 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1422 may include main memory and may be separate from or fabricated in a same integrated circuit as processor 1410. As shown in FIG. 14, non-removable memory 1422 stores firmware 1418, which may be present to provide low-level control of hardware. Examples of firmware 1418 include BIOS (Basic Input/Output System, such as on personal computers) and boot firmware (e.g., on smart phones). Removable memory 1424 may be inserted into a receptacle of or otherwise coupled to computing device 1402 and can be removed by a user from computing device 1402. Removable memory 1424 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1490 may be present that are internal and/or external to a housing of computing device 1402 and may or may not be removable. Examples of storage device 1490 include a hard disk drive, a SSD, a thumb drive (e.g., a USB (Universal Serial Bus) flash drive), or other physical storage device.

One or more programs may be stored in storage 1420. Such programs include operating system 1412, one or more application programs 1414, and other program modules and program data. Examples of such application programs may include, for example, computer program logic (e.g., computer program code/instructions) for implementing one or more of system 100, ledger database 200, system 300, system 500, system 700, database verifier 1000, and/or system 1300, along with any components and/or subcomponents thereof, as well as the flowcharts/flow diagrams (e.g., flowcharts 400, 420, 600, 800, and/or 900) described herein, including portions thereof, and/or further examples described herein.

Storage 1420 also stores data used and/or generated by operating system 1412 and application programs 1414 as application data 1416. Examples of application data 1416 include web pages, text, images, tables, sound files, video data, and other data, which may also be sent to and/or received from one or more network servers or other devices via one or more wired or wireless networks. Storage 1420 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1402 through one or more input devices 1430 and may receive information from computing device 1402 through one or more output devices 1450. Input device(s) 1430 may include one or more of touch screen 1432, microphone 1434, camera 1436, physical keyboard 1438 and/or trackball 1440 and output device(s) 1450 may include one or more of speaker 1452 and display 1454. Each of input device(s) 1430 and output device(s) 1450 may be integral to computing device 1402 (e.g., built into a housing of computing device 1402) or external to computing device 1402 (e.g., communicatively coupled wired or wirelessly to computing device 1402 via wired interface(s) 1480 and/or wireless modem(s) 1460). Further input devices 1430 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1454 may display information, as well as operating as touch screen 1432 by receiving user commands and/or other information (e.g., by touch, finger gestures, virtual keyboard, etc.) as a user interface. Any number of each type of input device(s) 1430 and output device(s) 1450 may be present, including multiple microphones 1434, multiple cameras 1436, multiple speakers 1452, and/or multiple displays 1454.

One or more wireless modems 1460 can be coupled to antenna(s) (not shown) of computing device 1402 and can support two-way communications between processor 1410 and devices external to computing device 1402 through network 1404, as would be understood to persons skilled in the relevant art(s). Wireless modem 1460 is shown generically and can include a cellular modem 1466 for communicating with one or more cellular networks, such as a GSM network for data and voice communications within a single cellular network, between cellular networks, or between the mobile device and a public switched telephone network (PSTN). Wireless modem 1460 may also or alternatively include other radio-based modem types, such as a Bluetooth modem 1464 (also referred to as a "Bluetooth device") and/or Wi-Fi 1462 modem (also referred to as an "wireless adaptor"). Wi-Fi modem 1462 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1464 is configured to communicate with another Bluetooth-capable device according to the Bluetooth short-range wireless technology standard(s) such as IEEE 802.15.1 and/or managed by the Bluetooth Special Interest Group (SIG).

Computing device 1402 can further include power supply 1482, LI receiver 1484, accelerometer 1486, and/or one or more wired interfaces 1480. Example wired interfaces 1480 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1480 of computing device 1402 provide for wired connections between computing device 1402 and network 1404, or between computing device 1402 and one or more devices/peripherals when such devices/peripherals are external to computing device 1402 (e.g., a pointing device, display 1454, speaker 1452, camera 1436, physical keyboard 1438, etc.). Power supply 1482 is configured to supply power to each of the components of computing device 1402 and may receive power from a battery internal to computing device 1402, and/or from a power cord plugged into a power port of computing device 1402 (e.g., a USB port, an A/C power port). LI receiver 1484 may be used for location determination of computing device 1402 and may include a satellite navigation receiver such as a Global Positioning System (GPS) receiver or may include other type of location determiner configured to determine location of computing device 1402 based on received information (e.g., using cell tower triangulation, etc.). Accelerometer 1486 may be present to determine an orientation of computing device 1402.

Note that the illustrated components of computing device 1402 are not required or all-inclusive, and fewer or greater numbers of components may be present as would be recognized by one skilled in the art. For example, computing device 1402 may also include one or more of a gyroscope, barometer, proximity sensor, ambient light sensor, digital compass, etc. Processor 1410 and memory 1456 may be co-located in a same semiconductor device package, such as being included together in an integrated circuit chip, FPGA, or system-on-chip (SOC), optionally along with further components of computing device 1402.

In embodiments, computing device 1402 is configured to implement any of the above-described features of flowcharts herein. Computer program logic for performing any of the operations, steps, and/or functions described herein may be stored in storage 1420 and executed by processor 1410.

In some embodiments, server infrastructure 1470 may be present in computing environment 1400 and may be communicatively coupled with computing device 1402 via network 1404. Server infrastructure 1470, when present, may be a network-accessible server set (e.g., a cloud-based environment or platform). As shown in FIG. 14, server infrastructure 1470 includes clusters 1472. Each of clusters 1472 may comprise a group of one or more compute nodes and/or a group of one or more storage nodes. For example, as shown in FIG. 14, cluster 1472 includes nodes 1474. Each of nodes 1474 are accessible via network 1404 (e.g., in a "cloud-based" embodiment) to build, deploy, and manage applications and services. Any of nodes 1474 may be a storage node that comprises a plurality of physical storage disks, SSDs, and/or other physical storage devices that are accessible via network 1404 and are configured to store data associated with the applications and services managed by nodes 1474. For example, as shown in FIG. 14, nodes 1474 may store application data 1478.

Each of nodes 1474 may, as a compute node, comprise one or more server computers, server systems, and/or computing devices. For instance, a node 1474 may include one or more of the components of computing device 1402 disclosed herein. Each of nodes 1474 may be configured to execute one or more software applications (or "applications") and/or services and/or manage hardware resources (e.g., processors, memory, etc.), which may be utilized by users (e.g., customers) of the network-accessible server set. For example, as shown in FIG. 14, nodes 1474 may operate application programs 1476. In an implementation, a node of nodes 1474 may operate or comprise one or more virtual machines, with each virtual machine emulating a system architecture (e.g., an operating system), in an isolated manner, upon which applications such as application programs 1476 may be executed.

In an embodiment, one or more of clusters 1472 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1472 may be a datacenter in a distributed collection of datacenters. In embodiments, exemplary computing environment 1400 comprises part of a cloud-based platform such as Amazon Web Services® of Amazon Web Services, Inc. or Google Cloud Platform™ of Google LLC, although these are only examples and are not intended to be limiting.

In an embodiment, computing device 1402 may access application programs 1476 for execution in any manner, such as by a client application and/or a browser at computing device 1402. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1402 may additionally and/or alternatively synchronize copies of application programs 1414 and/or application data 1416 to be stored at network-based server infrastructure 1470 as application programs 1476 and/or application data 1478. For instance, operating system 1412 and/or application programs 1414 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1420 at network-based server infrastructure 1470.

In some embodiments, on-premises servers 1492 may be present in computing environment 1400 and may be communicatively coupled with computing device 1402 via network 1404. On-premises servers 1492, when present, are hosted within an entity's infrastructure and, in many cases, physically onsite of a facility of that entity. On-premises servers 1492 are controlled, administered, and maintained by IT (Information Technology) personnel of the entity or an IT partner to the entity. Application data 1498 may be shared by on-premises servers 1492 between computing devices of the entity, including computing device 1402 (when part of an entity) through a local network of the entity, and/or through further networks accessible to the entity (including the Internet). Furthermore, on-premises servers 1492 may serve applications such as application programs 1496 to the computing devices of the entity, including computing device 1402. Accordingly, on-premises servers 1492 may include storage 1494 (which includes one or more physical storage devices such as storage disks and/or SSDs) for storage of application programs 1496 and application data 1498 and may include one or more processors for execution of application programs 1496. Still further, computing device 1402 may be configured to synchronize copies of application programs 1414 and/or application data 1416 for backup storage at on-premises servers 1492 as application programs 1496 and/or application data 1498.

Embodiments described herein may be implemented in one or more of computing device 1402, network-based server infrastructure 1470, and on-premises servers 1492. For example, in some embodiments, computing device 1402 may be used to implement systems, clients, or devices, or components/subcomponents thereof, disclosed elsewhere herein. In other embodiments, a combination of computing device 1402, network-based server infrastructure 1470, and/or on-premises servers 1492 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1420. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1414) may be stored in storage 1420. Such computer programs may also be received via wired interface(s) 1480 and/or wireless modem(s) 1460 over network 1404. Such computer programs, when executed or loaded by an application, enable computing device 1402 to implement features of embodiments discussed herein. Accordingly, such computer programs represent controllers of the computing device 1402.

Embodiments are also directed to computer program products comprising computer code or instructions stored on any computer-readable medium or computer-readable storage medium. Such computer program products include the physical storage of storage 1420 as well as further physical storage types.

V. Additional Example Embodiments

In an embodiment, a system includes a processor circuit and a memory. The memory stores program code that, when executed by the processor circuit, performs operations. The operations include receiving a first request from a first computing device on behalf of a first entity to update an attribute map maintained by a ledger database. The first request includes a first digest representative of a state of the ledger database and a first attribute of a user. The attribute map includes a reference to an identity of the user. The operations further include validating the ledger database based on the first digest and, in response to said validating, associating, in the attribute map, the first attribute with the reference to the identity of the user. The operations further include generating a second digest representative of the state of the ledger database after associating the first attribute with the reference to the identity of the user. The operations further include providing the first entity access to the second digest.

In an embodiment, associating, in the attribute map, the first attribute with the reference to the identity of the user further includes associating a secret corresponding to the first attribute with the reference to the identity of the user.

In an embodiment, the operations further include receiving a second request from a second computing device on behalf of the user to access data protected by a security policy. The second request comprising the second digest and an identity of the user. The operations further include validating the ledger database based on the second digest and, in response to said validating, locating the secret in the attribute map based on the identity of the user. The operations further include, in response to said locating, providing the secret to a verification system. The operations further include receiving, from the verification system, an indication that the user is verified. The operations further include providing the user access to the data protected by the security policy.

In an embodiment, the attribute map is signed by a private signing key of the first entity corresponding to a public signing key of the first entity.

In an embodiment, the first attribute is signed by a first private signing key of the first entity corresponding to a first public signing key of the first entity. The attribute map further includes a second attribute associated with the reference to the identity of the user. The second attribute is signed by a second private signing key of a second entity corresponding to a second public signing key of the second entity.

In an embodiment, the first attribute is signed by a first private signing key of the first entity corresponding to a first public signing key of the first entity. The attribute map is signed by a second private signing key of a second entity corresponding to a second public signing key of the second entity.

In an embodiment, the reference to the identity of the user is a reference to an identity map comprising the identity of the user.

In an embodiment, the reference to the identity of the user is a copy of the identity of the user.

In an embodiment, the reference to the identity of the user is the identity of the user.

In an embodiment, the identity of the user is at least one of: an e-mail address of the user, a username of the user, or a phone number of the user.

In an embodiment, validating the ledger database based at least on the first digest includes: generating a hierarchical hash data structure representative of rows of the ledger database; determining a root hash value for a root node of the hierarchical hash data structure; and determining that the root hash value is equal to the first digest.

In an embodiment, the hierarchical hash data structure is a Merkle tree.

In an embodiment, providing the first entity access to the second digest includes publishing the second digest to a web page that is accessible to the computing device.

In an embodiment, providing the first entity access to the second digest includes providing the second digest to the computing device.

In an embodiment a method is performed. The method includes receiving a request from a computing device on behalf of a user to access data protected by a security policy. The request includes a digest representative of a state of a ledger database and an identity associated with the user. The ledger database maintains an attribute map that includes a reference to the identity associated with the user and attribute information of the user. The ledger database is validated based on the digest. In response to said validating, the attribute information is located in the attribute map based on the identity of the user. The attribute information is provided to a verification system. An indication that the user is verified is received from the verification system. In response to said receiving the indication, the computing device is provided access to the data protected by the security policy.

In an embodiment, the attribute information comprises one or more of: an attribute associated with the user or a secret corresponding to the attribute associated with the user.

In an embodiment, the security policy is a zero trust security policy.

In an embodiment, the attribute map is signed by one or more of: a private signing key corresponding to a public signing key of a database administrator associated with the attribute map; a private signing key corresponding to a public signing key of a system administrator associated with the attribute map; a private signing key corresponding to a public signing key of a cloud administrator associated with the attribute map; or a private signing key corresponding to a public signing key of a publishing administrator associated with the attribute map.

In an embodiment, the reference to the identity of the user is: a reference to an identity map comprising the identity of the user; or the identity of the user.

In an embodiment, said validating includes generating a hierarchical hash data structure representative of rows of the ledger database. A root hash value for a root node of the hierarchical hash data structure is determined. A determination that the root hash value is equal to the digest is made.

In an embodiment, a computer-readable storage medium has program instructions recorded thereon that, when executed by a processor circuit, receive a request from a computing device on behalf of a first entity to remove an attribute of a user from an attribute map maintained by a ledger database. The request includes a first digest representative of a state of the ledger database. The program instructions, when executed by the processor circuit, validate the ledger database based on the first digest. The program instructions, when executed by the processor circuit and in response to said validating, remove, from the attribute map, the attribute of the user. The program instructions, when executed by the processor circuit, generate a second digest representative of the state of the ledger database after removing the attribute of the user. The program instructions, when executed by the processor circuit, provide the first entity access to the second digest.

In an embodiment, the request further includes instructions to remove a secret corresponding to the attribute of the user from the attribute map maintained by a ledger database. The program instructions, when executed by the processor circuit and in response to said validating, remove, from the attribute map, the secret corresponding to the attribute of the user.

In an embodiment, the attribute map includes a reference to an identity of the user associated with the attribute. The request includes instructions to remove the reference to the identity of the user from the attribute map. The program instructions, when executed by the processor circuit and responsive to said validating, remove, from the attribute map, the reference to the identity of the user from the attribute map.

In an embodiment, the reference to the identity of the user is a reference to an identity map comprising the identity of the user.

In an embodiment, the reference to the identity of the user is a copy of the identity of the user.

In an embodiment, the reference to the identity of the user is the identity of the user.

In an embodiment, the identity of the user is at least one of: an e-mail address of the user, a username of the user, or a phone number of the user.

In an embodiment, the attribute map is signed by a private signing key of the first entity corresponding to a public signing key of the first entity.

In an embodiment, the attribute is signed by a first private signing key of the first entity corresponding to a first public signing key of the first entity. The attribute map further includes a second attribute of the user. The second attribute is signed by a second private signing key of a second entity corresponding to a second public signing key of the second entity.

In an embodiment, the attribute is signed by a first private signing key of the first entity corresponding to a first public signing key of the first entity. The attribute map is signed by a second private signing key of a second entity corresponding to a second public signing key of a second entity.

In an embodiment, said validating the ledger database based at least on the first digest includes: generating a hierarchical hash data structure representative of rows of the ledger database; determining a root hash value for a root node of the hierarchical hash data structure; and determining that the root hash value is equal to the first digest.

In an embodiment, the hierarchical hash data structure is a Merkle tree.

In an embodiment, said providing the first entity access to the second digest includes publishing the second digest to a web page that is accessible to the computing device.

In an embodiment, said providing the first entity access to the second digest includes providing the second digest to the computing device.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:

a processor circuit; and a memory that stores program code that, when executed by the processor circuit, performs operations, the operations comprising:

receiving a first request from a first computing device on behalf of a first entity to update an attribute map maintained by a first ledger database, the first request comprising an identifier of the first entity, a first digest representative of a state of the first ledger database and a first attribute of a user, the attribute map comprising a reference to an identity of the user, the first attribute signed with a first signature of a first private key associated with the first entity;

obtaining a first public key associated with the first entity from a first identity map maintained by a second ledger database, the first identity map comprising a plurality of identifiers corresponding to a plurality of entities and a plurality of public keys in association with the entities, the plurality of identifiers comprising the identifier of the first entity and the plurality of public keys comprising the first public key;

verifying the first signature with the first public key;

validating the ledger database based on the first digest;

in response to said verifying and said validating, associating, in the attribute map, the first attribute with the reference to the identity of the user;

generating a second digest representative of the state of the ledger database after associating the first attribute with the reference to the identity of the user; and providing the first entity access to the second digest.

2. The system of claim 1, wherein said associating comprises:

associating a secret corresponding to the first attribute with the reference to the identity of the user.

3. The system of claim 2, the operations further comprising:

receiving a second request from a second computing device on behalf of the user to access data protected by a security policy, the second request comprising the second digest and an identity of the user;

validating the ledger database based on the second digest;

in response to said validating, locating the secret in the attribute map based on the identity of the user;

in response to said locating, providing the secret to a verification system;

receiving, from the verification system, an indication that the user is verified; and providing the user access to the data protected by the security policy.

4. The system of claim 1, wherein the attribute map is signed by a private signing key of the first entity corresponding to a public signing key of the first entity.

5. The system of claim 1, wherein:

the attribute map further comprises a second attribute associated with the reference to the identity of the user, the second attribute signed with a second signature of a second private key associated with a second entity, the second private key corresponding to a second public key associated with the second entity.

6. The system of claim 1, wherein:

the attribute map is signed with a second signature of a second private key associated with a second entity, the second private key corresponding to a second public key associated with the second entity.

7. The system of claim 1, wherein the reference to the identity of the user is a reference to a second identity map comprising the identity of the user.

8. The system of claim 1, wherein said validating comprises:

generating a hierarchical hash data structure representative of rows of the ledger database;

determining a root hash value for a root node of the hierarchical hash data structure; and determining that the root hash value is equal to the first digest.

9. The system of claim 1, wherein said providing comprises:

publishing the second digest to a web page that is accessible to the computing device.

10. A method comprising:

receiving a request from a computing device on behalf of a user to access data protected by a security policy, the request comprising a digest representative of a state of a first ledger database and an identity associated with the user, the first ledger database maintaining an attribute map that comprises a reference to the identity associated with the user and attribute information of the user;

validating the first ledger database based on the digest;

in response to said validating, locating the attribute information in the attribute map based on the identity of the user;

providing the attribute information to a verification system;

receiving, from the verification system, an indication that the user is verified identifying an identity map based on the reference to the identity of the user, the identity map maintained by a second ledger database and comprising a plurality of identities corresponding to a plurality of users and a plurality of public keys in association with the users, the plurality of identities comprising the identity of the user and the plurality of public keys comprising the public key of the user;

receiving the public key of the user from the identity map;

causing the data protected by the security policy to be encrypted with the public key of the user, resulting in encrypted data; and providing the computing device access to the encrypted data.

11. The method of claim 10, wherein the attribute information comprises:

an attribute associated with the user; or a secret corresponding to the attribute associated with the user.

12. The method of claim 10, wherein the security policy is a zero trust security policy.

13. The method of claim 10, wherein the attribute map is signed by:

a private signing key corresponding to a public signing key of a database administrator associated with the attribute map;

a private signing key corresponding to a public signing key of a system administrator associated with the attribute map;

a private signing key corresponding to a public signing key of a cloud administrator associated with the attribute map; or a private signing key corresponding to a public signing key of a publishing administrator associated with the attribute map.

14. The method of claim 10, wherein said validating comprises:

generating a hierarchical hash data structure representative of rows of the ledger database;

determining a root hash value for a root node of the hierarchical hash data structure; and determining that the root hash value is equal to the digest.

15. The method of claim 10, wherein the attribute map is managed by the first entity and the identity map is managed by a second entity different from the first entity.

16. A computer-readable storage medium having program instructions recorded thereon that, when executed by a processor circuit:

receive a request from a computing device on behalf of a first entity to remove an attribute of a user from an attribute map maintained by a first ledger database, the request comprising an identifier of the first entity and a first digest representative of a state of the ledger database, the request signed with a signature of a private key associated with the first entity;

obtain a public key associated with the first entity from a first identity map maintained by a second ledger database, the first identity map comprising a plurality of identifiers corresponding to a plurality of entities and a plurality of public keys in association with the entities, the plurality of identifiers comprising the identifier of the first entity and the plurality of public keys comprising the public key;

verify the signature of the request with the public key;

validate the ledger database based on the first digest;

in response to said verifying and said validating, remove, from the attribute map, the attribute of the user;

generate a second digest representative of the state of the first ledger database after removing the attribute of the user; and provide the entity access to the second digest.

17. The computer-readable storage medium of claim 16, wherein:

the attribute map comprises a reference to an identity of the user associated with the attribute;

the request includes instructions to remove the reference to the identity of the user from the attribute map; and the program instructions, when executed by the processor circuit and responsive to said verifying and said validating, remove, from the attribute map, the reference to the identity of the user from the attribute map.

18. The computer-readable storage medium of claim 17, wherein the reference to the identity of the user is a reference to a second identity map comprising a plurality of identities corresponding to a plurality of users and a plurality of user keys in association with the users, the plurality of identities comprising the identity of the user and the plurality of user keys comprising a user key associated with the user.

19. The computer-readable storage medium of claim 16, wherein the attribute map is signed by the private key of the entity.

20. The computer-readable storage medium of claim 16, wherein said providing comprises:

publishing the second digest to a web page that is accessible to the computing device.

\* \* \* \* \*